(12) United States Patent
Grivel et al.

(10) Patent No.: US 12,400,271 B2
(45) Date of Patent: Aug. 26, 2025

(54) ELECTRONIC SYSTEM FOR FORWARD-LOOKING MEASUREMENTS OF FREQUENCIES AND/OR PROBABILITIES OF ACCIDENT OCCURRENCES BASED ON LOCALIZED AUTOMOTIVE DEVICE MEASUREMENTS, AND CORRESPONDING METHOD THEREOF

(71) Applicant: Swiss Reinsurance Company Ltd., Zürich (CH)

(72) Inventors: David Grivel, Magnusstrasse (CH); Luigi Di Lillo, Rümlangerstrasse (CH); Donato Genovese, Allenmoosstrasse (CH)

(73) Assignee: Swiss Reinsurance Company Ltd., Zurich (CH)

( * ) Notice: Subject to any disclaimer, the term of this patent is extended or adjusted under 35 U.S.C. 154(b) by 0 days.

(21) Appl. No.: 17/816,850

(22) Filed: Aug. 2, 2022

(65) Prior Publication Data
US 2022/0383421 A1  Dec. 1, 2022

Related U.S. Application Data

(63) Continuation of application No. PCT/EP2021/084075, filed on Dec. 2, 2021.

(30) Foreign Application Priority Data

Dec. 2, 2020  (EP) ..................................... 20211351

(51) Int. Cl.
*G06Q 40/00* (2023.01)
*B60W 40/09* (2012.01)
*G06Q 40/08* (2012.01)

(52) U.S. Cl.
CPC ............ *G06Q 40/08* (2013.01); *B60W 40/09* (2013.01); *B60W 2540/30* (2013.01)

(58) Field of Classification Search
CPC ... G06Q 40/08; B60W 40/09; B60W 2540/30
(Continued)

(56) References Cited

U.S. PATENT DOCUMENTS

| 7,308,388 B2 * | 12/2007 | Beverina ................ G06Q 50/26 703/2 |
| 11,338,815 B1 * | 5/2022 | Healy ...................... G07C 5/02 |

(Continued)

OTHER PUBLICATIONS

A Rear-End Collision Risk Evaluation and Control Scheme Using a Bayesian Network Model; IEEE Transactions on Intelligent Transportation Systems (vol. 20, Issue: 1, pp. 264-284); Chen Chen, Xiaomin Liu, Hsiao-Hwa Chen, Meilian Li, Liqiang Zhao, May 22, 2018. (Year: 2018).*

(Continued)

*Primary Examiner* — Tien C Nguyen
(74) *Attorney, Agent, or Firm* — Oblon, McClelland, Maier & Neustadt, L.L.P.

(57) ABSTRACT

Proposed is an electronic risk measuring and scoring system, in particular for mobile telematics devices and method thereof. In particular, an electronic risk measuring and scoring system which measures an ADAS risk score measure measuring the impact of ADAS features to the accident risk associated with a motor vehicles, and which rates and calibrates a risk-transfer user-specifically thereby capturing the impact of ADAS features in measures of risk-transfer claims frequency and severity.

18 Claims, 14 Drawing Sheets

(58) Field of Classification Search
USPC .... 705/35, 39, 40, 45, 37, 38, 26, 1.1, 7.28, 705/311, 34, 26.35; 701/533; 348/77; 715/205; 235/492, 462.46; 340/5.74
See application file for complete search history.

(56) References Cited

U.S. PATENT DOCUMENTS

| | | | | |
|---|---|---|---|---|
| 2003/0149657 | A1* | 8/2003 | Reynolds | G06Q 40/03 705/38 |
| 2004/0059592 | A1* | 3/2004 | Yadav-Ranjan | G06Q 50/165 705/347 |
| 2011/0160935 | A1* | 6/2011 | Newman | E05F 15/46 701/2 |
| 2012/0317058 | A1* | 12/2012 | Abhulimen | G06N 20/00 706/2 |
| 2013/0197965 | A1* | 8/2013 | Leitch | G06Q 10/0635 705/7.28 |
| 2014/0074402 | A1* | 3/2014 | Hassib | G01C 21/3461 701/533 |
| 2014/0257862 | A1* | 9/2014 | Billman | G06Q 50/163 705/4 |
| 2014/0289098 | A1* | 9/2014 | Walzak | G06Q 40/03 705/38 |
| 2015/0186714 | A1* | 7/2015 | Ren | G06V 40/103 348/77 |
| 2018/0025430 | A1 | 1/2018 | Perl et al. | |
| 2018/0075380 | A1 | 3/2018 | Perl et al. | |
| 2019/0135177 | A1* | 5/2019 | Farrell | B60Q 9/00 |
| 2020/0175786 | A1* | 6/2020 | Bongers | G01S 19/52 |

OTHER PUBLICATIONS

A Data-Driven Approach for Driving Safety Risk Prediction Using Driver Behavior and Roadway Information Data; IEEE Transactions on Intelligent Transportation Systems (vol. 19, Issue: 2, pp. 446-460); Nasim Arbabzadeh, Mohsen Jafari; Jun. 9, 2017. (Year: 2017).*
Telematics and Road Safety; 2018 2nd International Conference on Telematics and Future Generation Networks (TAFGEN) (pp. 103-108); Sivaramalingam Kirushanth, Boniface Kabaso; Jul. 24, 2018. (Year: 2018).*
End-to-End Autonomous Driving Risk Analysis: A Behavioural Anomaly Detection Approach; IEEE Transactions on Intelligent Transportation Systems (vol. 22, Issue: 3, 2021, pp. 1650-1662); Cian Ryan, Finbarr Murphy, Martin Mullins; Aug. 3, 2020. (Year: 2020).*
International Search Report mailed on Mar. 10, 2022 in International Application No. PCT/EP2-21/084075.

* cited by examiner

ELECTRONIC SYSTEM FOR FORWARD-LOOKING MEASUREMENTS OF FREQUENCIES AND/OR PROBABILITIES OF ACCIDENT OCCURRENCES BASED ON LOCALIZED AUTOMOTIVE DEVICE MEASUREMENTS, AND CORRESPONDING METHOD THEREOF

CROSS REFERENCE TO RELATED APPLICATION

The present application is a continuation application of International Patent Application No. PCT/EP2021/084075, filed Dec. 2, 2021, which is based upon and claims the benefits of priority to European Application No. 20211351.0, filed Dec. 2, 2020. The entire contents of all of the above applications are incorporated herein by reference.

FIELD OF THE INVENTION

The present invention relates to the field of autonomous vehicle driving, in particular to forward-looking measurements of frequencies of localized accident occurrence rates based on automotive device measurements, in particular by means of simulative, predictive processing structures. More particular to predictive risk measurements for motor vehicles provided with Advanced Driver-Assistance Systems (ADAS) features. Further, the present invention relates to the field of automated risk-transfer and risk-measuring technology, providing the technical means for direct measuring of ADAS risk index and risk score measures, which inter alia is also applicable to the measuring of risk-transfer rating factors, in particular predictive measures calibrated on a specific portfolio of risk-transfer structures, measuring and capturing the actual impact of activated ADAS technology in terms of occurring claim frequencies and measured associated severities and event occurrence strength. The ADAS risk score measure is inter alia applicable for: (1) Automated portfolio profitability analysis and measurements. The score allows to provide insight measures for a client's exposure to ADAS (descriptive analytics) as well as a set of advanced automated portfolio analyses highlighting the enhanced predictive power of a motor risk model. The system allows to provide potential impacts based on the ADAS risk score on a client's risk-transfer tariff and pricing strategy; and (2) Underwriting Factor. The ADAS risk score can be provided at point of quote. Through the inventive, automated, automotive portal, the ADAS risk score can be provided globally, at vehicle level and easily accessible in near-real time. Thus, the invention also relates to mobile real-time measuring systems based on forward-looking simulative processing and thus reacting dynamically on captured environmental or operational parameters, in particular to telematics system's monitoring, capturing and reacting on motion parameters of motor vehicles during operation or mobile telematics devise in general, thereby measuring, detecting and identifying tips and trip segments of moving telematics devices. The present invention further relates to telematics based automation of risk-transfer, alert and real-time notification systems based on the usage of telematics associated with motor vehicles and wireless technology used in the context of telematics and automated trip measurements and recognition. Finally, the invention also relates to telematics-based real-time or near real-time expert systems. The term telematics, in particular traffic telematics, refers to systems that are used for communications, instrumentation and control, and information technology in the field of telecommunication and/or transportation. Thus, the present invention relates to the use of telematics together with real-time event-occurrence-frequencies-monitoring, automated risk-transfer and automated insurance systems based on captured and measured usage-based and/or user-based telematics data, in particular dynamically measured motion sensory parameter values.

BACKGROUND OF THE INVENTION

According to a WHO statistics form 2001, each year more than one million people die worldwide in traffic crashes and further fifty million people are seriously injured as the result of driving. Typically, human errors are one of the major root cause in road accidents in today's world. Thus, human errors have a measurable impact one the actual occurrence frequency of accidents in daily traffic streams. The simulated and/or forecasted frequency of accidents at a certain geographic location based on physical measures such as technical parameters of the car involved, driving style, driver condition, technical car condition, contextual measuring parameters (weather, daylight etc.) etc. can be given by a probability measuring value in dependence of the location, severity of accident occurrence and defined future time window together with a measuring error and/or forecasting error value. Thus, the actual measured accident frequency in the defined future time window will be measured with a certain probability within the range of variation given by the forecasted occurrence probability measure x and the associated measuring and forecasting error. For example, the probability that the actual measured occurrence frequency will be in the range of variation (scatter) around the value x can e.g. be characterized by its mean distance squared from the mean, i.e. the standard deviation s. The square of the standard deviation is typically called variance $s^2$. The forecasted probability value is typically provided as an index measure between 0 and 1 and is also denoted as indexed risk value or measure, or a little bit sloppy simply risk given by a time-dependent, localized risk value.

To translate it to the above discussed problem, it can be said that every driver is afflicted with as a real-existing, i.e. is a risk taker having a physical measurable and time/location-dependent driving risk. From the technical forecasting and simulation side, the human as a driver in road vehicles composed of human, mechanical and electrical components is constantly exposed to changing surroundings (e.g., road conditions, environment) which deteriorate the driver's capacities leading to a potential accident. To improve the risk, i.e. to decrease the occurrence frequency of accidents, similar to other complex and safety sensitive transportation systems, the road vehicles can comprise to rely on both advanced technologies (i.e., Advanced Driver Assistance Systems (ADAS)) and Passive Safety Systems (PSS) (e.g., seatbelts, airbags) in order to mitigate the risk of accidents and casualties. A major disadvantage of prior art risk measuring and forecasting systems is, that the advantages and disadvantages of ADAS as active safety systems as well as passive safety systems in road vehicles cannot be considered on a proper technical basis. One of the technical problem is, that it is difficult to provide feed-forward simulations that allow to capture and/or measure the complex interactions between human as a driver and ADAS Warning and Crash Avoidance Systems and PSS in the design of vehicles. Thereafter, there is a strong demand (and an object of the present invention) for developing reliable forecasting and measuring systems allowing to make reliability prediction at any given time on the road transportation for vehicles equipped with ADAS and PSS. Finally, the present invention has also implications and is also usable for improvement of vehicle designs and prevention of casualties since the dependence and impacts of different safety features can be measured directly.

It is characteristic for the present problem, that drivers constantly have to make dynamic adjustments and adaptations to their driving behavior in response to dynamic changes, since the condition of road systems typically is constantly changing. Any drivers' distractions reduce drivers' situation awareness that may lead to road crashes. There are various non-driving-related activities that may cause drivers' distractions. As studies prove, there is no doubt that driver's error is a major factor in road fatalities. 78% of accidents and 67% of near accidents involved momentary inattention (within 3 seconds) before the incident. It has been reported that driver's error is a causal factor in 75% up to 95% of road crashes (dependent on the study cited). Such human error studies have been conducted in a wide range of industries such as aviation, nuclear power, and healthcare, however relatively little measurements and research has systematically been conducted to examine the nature and factors contributing to driver error in road transportations. Driving performance is impaired when insufficient attention is devoted to the driving tasks, or the driver is distracted by engagement in another task. However, measurements are technically complex. For example, measurements of driver's distraction need to consider and differentiate e.g. reduced longitudinal, lateral control, reduced situation awareness, and degraded response times to road hazards etc. Further, technology (e.g., reaching CD player, using GPS map, using cell phones) and non-technology based (e.g., sightseeing, talking with passengers) distractions may have different contributions, though both cause an increased risk of crash involvement, with rough estimates indicating that secondary task distraction is a contributing factor in up to 23% of crashes and near-crashes. More complexity is introduced by the fact that both human and non-human related factors may cause driver errors interrelated, however, their interaction and interfaces are difficult to measure or simulate. This also related to the correct technical weighting of the factor, since e.g. factors such as fatigue, distraction, and inattention may be more prominent in road safety however, data related to fatigue-induced accidents (e.g. Australian Road Crash Database (ATSB)) though acknowledging this fact, are poorly understood.

In view of the driver's error resulting in severe consequences in road transportations, the development of countermeasures to mitigate the human errors through training and technology (e.g., Intelligent Transport Systems) and a better road system became a real demand. Needless to say, that also law enforcement resulted in significant reduction of accident rates during the last decades as the result of improvement in vehicle and road design along with promotion of public awareness. However, there is still a demand to elimination or reduction of road fatalities and to substitute as much as possible the failing component (i.e., the human driver) with more reliable means. It is estimated that about 14,000 lane change and road departure crashes could have been prevented with warning systems in vehicles in the European Union per year. Further, it is estimated that almost 24,000 rear-end, 2000 lane change, and 3000 road departure crashes could be prevented alone in Germany if the vehicles had crash avoidance technologies. In addition, it can be shown that occupant survivability subsequent to crashes can be increased with improvements in vehicle design. The ADAS and PSS technologies are two approaches used in modern vehicles to mitigate the risk of accidents or casualties resulting from human error.

The present invention allows to technically measure the impact of safety features and to analyze the safety features of ADAS and PSS in the design of road vehicles considering the demanding and tedious nature of operating a road vehicle which may pose drivers at the risk of committing error. The present invention proposes, inter alia, a novel technical measuring, simulation and/or modeling approach to make assessment and prediction/forecast, at any instance of time, on the reliability of a modern vehicle composed of human as a driver, ADAS Warning System, ADAS Crash Avoidance System, and PSS. The present invention may be used in design and improvement of vehicles and utilized in the safety assessment of road transportations and the development of new safety promotion policies, standards and methodologies by the transportation safety authorities and technically skilled persons.

The reduction of road transportation casualties/accidents can be achieved by integrating both "Active" and "Passive" safety approach in design of vehicles. The passive safety system refers to the safety technology embedded in a vehicle, which is specifically designed to reduce injuries in the event of a crash (e.g., airbags and advanced seat belt). On the other hand, the active safety refers to technologies that are designed to prevent crash incidence (e.g., Intelligent Speed Adaptation (ISA), Lane Departure Warnings (LDWs), Speed Warning). The modern vehicles are typically at least partially equipped with both passive and active safety devices such that if the active safety measures fail to act effectively then a level of protection of the occupants is provided in accidents through passive safety systems. ADAS aims at supporting drivers by either providing the warning to reduce risk exposure (e.g., driving over the speed limit, raising driver alertness or triggering control tasks which takes over the vehicle control to eliminate many of the driver errors leading to accidents, to prevent DUI (Driving under Influence), and to assist in a better control of the vehicle (e.g., improving visibility of the road environment). Now, technologies such as forward collision warning and avoidance systems, lane departure warning, side view assist, adaptive headlights, adaptive cruise control, and many more have become available in the market and many more are under development. ADAS functions can be achieved through either an autonomous approach that includes on board intelligent vehicle systems, and wayside systems or cooperative approach which rely on interfaces between the vehicle and other vehicles on road and the road system components.

In respect to measuring and forecasting/simulation systems, it is important to not, that ADAS systems and PSS systems may have positive and/or negative impact on the measured accident occurrence rate. The use of ADAS system may have several positive impacts such as mitigation of exposure to risky conditions, and improvement of driver behavior (e.g., reduced driving speed and speed variability, smaller lane deviations, faster reaction times, less harsh braking and enhanced alertness) and eradication of driver errors. However, the potential negative effects include: (i) drivers' shifted attention to road environment information that causes insufficient attention to the primary driving tasks, (ii) inappropriate driver reactions (e.g. harsh braking) that results in unexpected warnings, (iii) driver frustration with warning systems due to unnecessary frequent system warnings, (iv) driver frustration when certain elements of the driving tasks are taken over by the system in contrast to driver's desire. The positive impact of PSS is to protect the lives of people in case of accident as the last resort by designers in the event of human and ADAS failures. However, the inappropriate designed and equipped PSS may result in injuries and even death for passengers and driver involved in accident.

The technical concepts of some of the available ADAS technologies can be described as follows: (A) Cooperative Based Systems connect individual vehicle by communication to the other vehicles or road infrastructures. With inter-vehicle communication, for example, forward collision warning and avoidance, systems can send an emergency braking message to its following vehicles, or a vehicle can send Global Positioning System (GPS) data to the other vehicles in order to warn them of approaching vehicles beyond their range of view. Also, road operators can provide drivers with dynamic information such as conditions of road surface, traffic, and weather. Road train systems, which could connect the leading vehicle to the following vehicles let the driver experience hands and feet free of driving tasks while the computer system takes control; (B) Forward Collision Warning and Collision Avoidance Systems are developed to reduce rear-end collisions, which represent about 28% of all collisions between vehicles. The system is made up of cameras and radar sensors to monitor the area in front of a vehicle. Forward collision warning systems provide warnings (visual, audible, haptic) to a driver when the occurrence of imminent crash with the leading vehicle is likely and the collision avoidance systems take action only if the driver fails to respond to the warning indicated, for example by applying a limited or full brake; (C) Side and Rear View Assistant Systems use cameras or radar sensors to monitor surrounding areas of a vehicle and warn the driver of vehicles in the side or rear blind zones; (C) Lane Departure Warning Systems use cameras to monitor vehicle position within the lane, warning the driver if the vehicle is in risk of straying across lane markings; (D) Vision Enhancement Systems capture and presents the road scene with a greater contrast in situations with degraded visibility using an infra-red camera with either head-up or head-down display (HUD/HDD); (E) Adaptive Cruise Control Systems is used for a longitudinal vehicle control with the use of a microwave radar, sensor, and distance control device by maintaining a safe gap such that the set speed of the vehicle is maintained until the leading vehicle gets slower speed than the following vehicle. This results in reduction of the speed in the following vehicle; (F) Vigilance Monitoring System monitors time that driver's views are off the road, and it warns the driver if his/her eyes are off the road for an extended time as head position and eye closure are strong indicators of fatigue. Some studies show that that the visual monotony is a key input to driver fatigue; and (G) Navigation System assists a driver in planning routes and navigates in real time so that the driver may be advised of when to join or leave roads safely in a timely manner.

Another technical problem relies to the reliable simulation and forward-looking measurement of the interface between driver, ADAS warning, ADAS crash avoidance and passive safety systems. Although the functional failure of the autonomous technologies in vehicles is remote (reliability over 98%), they might be tricked by complex and unexpected situations, whereas human may be capable to resolve the problems when they are not susceptible to fatigue, distraction, and inattention. In a typical vehicle, a driver applies the control systems in order to move the vehicle through the road environment, whereas in more advanced vehicles, two drivers (i.e., the human driver and the autonomous driver) could collaboratively control the vehicle. All drivers experienced warnings from a passenger on a potentially dangerous situation in roads; these warnings can save numerous lives every day. It is to be noted that unlike other complex and potentially dangerous vehicles such as planes and ships, road vehicles is operated by a single person, whereas that the person is prone to error and slow to recognize potential hazards. A vehicle equipped with ADAS technologies as automated co-driver can double check life critical actions, relieve the driver of tedious activities, and warn about missed road events to improve the driver's reaction time and if necessary act autonomously to avoid crashes.

In the future, probably all are almost all vehicles will be equipped with suitable ADAS technologies to save lives. Nevertheless, both active and passive safety systems will remain essential in vehicles to protect lives in the event of driver's error. The nature and sequence of interactions between the driver as vehicle operator, ADAS warning, ADAS crash avoidance system and vehicle passive systems can e.g. be shown by the exemplary block diagram as shown in FIG. 9 (structure 1). The shown parametrization is able to capture a specific technical vehicle design where once the driver fails to operate the vehicle safely, the ADAS warning system gives necessary alarms to driver, the failure in ADAS warning leads to activation of ADAS Crash avoidance system and finally the failure in ADAS crash avoidance system results in activation of vehicle passive system (PSS). Structure 1 can be taken as a basic level of the structures 2-4 which are presented by FIGS. 10-12. The risk of accidents depends on the principle of design (e.g., modules in parallel). The risk impact of such system composed of Driver, Active (ADAS Warning and ADAS Crash Avoidance Systems) and Passive safety systems as illustrated in FIG. 1 can e.g. be parameterized at any given time based on the relation 1.

Precise risk measurements, i.e. dedicated forward-looking measurements of accident occurrence probabilities in respect to the specific activated safety measures, are also a necessary technical precondition for optimized automated risk-transfer by means of technically automated risk-transfer systems and optimized allocation of monetary resources, i.e. determination of optimal ranges or exact values of resource amounts. Driving a vehicle, almost worldwide, means that the driver somehow must or wants to be safeguarded against the probability of a loss and/or damage related impact of a physical occurring accident event during operation of the vehicle, i.e. wants to transfer the risk or the occurrence of an accident event, for example, by transferring the risk by means of appropriate risk transfer systems providing vehicle risk covers for possibly occurring loss-impacting physical events. The rate for the risk-transfer is normally assigned by a human expert, e.g., an auto insurance agent, deciding on whether a specific driver is a high or low-risk driver. Traditionally, the assigned human expert's rating considerations depend on only few different factors. For instance, one of the most common risk factors include personal considerations that are used to calculate a driver's risk is age. For example, drivers between the ages of 25 and 55 are considered to be in the prime age bracket and are considered a lower risk. Gender is another factor, since women drivers are usually considered as a lower risk in general, however this is slowly changing because more and more registered drivers are women. Single parents are also considered as less of a risk. Risk transfer systems or insurances take into consideration that a single parent is already responsible enough to parent a child alone, so they are more likely to be financially responsible as well. In a similar vein, married drivers are normally rated better for their car risk-transfers or insurance policies than a single driver does. They are thought to be more stable than single drivers due the fact that they often have more responsibilities. A single driver of the same age with the same driving record as a married person will be assessed as a higher risk simply because of their marital status.

Also driving history plays a central role in the rating. If a driver has any type of driving violation attached to his driving history, he will be rated to a higher risk-transfer rate than someone whose driving record has no infractions. Any prior accidents that a driver has been involved in will be reflected on his driving record, which increases his risk rating. In some risk-transfer systems, even a severe penalty is put on such a driving record for up to five years after the accident has occurred. Any type of speeding ticket is normally also part of the driving history and raises a driver's risk factor. Speeding reflects carelessness and a disregard for the driving laws and official risk limits set in place by the government. Normally, risk-transfer systems will consider any type of speeding ticket as a bad reflection of the driver. This is calculated into the risk rating and will ultimately increase the rating or risk-transfer premium. Driving under the influence of alcohol or drugs, as reflected by the driving history, which may not only cause a moving violation ticket, but may also cause driver's license to become suspended or worst case scenario, revoked. Therefore, as per traditional systems, the better a driving record or driving history is free of accidents, tickets, moving violations, the lower the risk rating will be which will result in lower risk-transfer rates (typically occurring in a periodic monetary premium to be transferred to the risk-transfer system for capturing the assigned risk, i.e. for covering a possibly occurring loss impact to an object by a physically occurring (risk) event).

Further, contextual factors can play a role, as the factor of a vehicle being used as a personal vehicle or strictly for business, which affects in many prior-art systems the risk rating. In addition, the distance a driver drives to and from work every day may be another factor which can be considered for the risk rating, in the prior-art. The less mileage a driver accrues per year, the less of a risk he is exposed. If a driver only drives a few miles a day to reach his job site, his risk of having an accident is lower so his rating will be better. Also, teenage drivers are considered an extremely high risk when it comes to driving. Various prior-art risk rating statistics acknowledge that teenage drivers have an extremely high crash rate due to their inexperience and lack of maturity. Vehicle accidents are often the leading cause of death for teenagers. This is another factor that is used to rate a risk to be transferred, i.e., an insurance risk. In opposite to teenagers' specific rating, in some risk-transfer systems, the number of years a driver has been driving also matters. This is tied into the age factor of drivers, but some people do not always start driving as soon as they hit the legal age. A driver of the same age who has been driving for the last 10 years will be rated significantly lower because such drivers typically are considered to be less of a risk.

Another factor is the area where the driver resides, which typically plays a major role in how a car risk-transfer is rated. Drivers who, for example, claim a residence in a larger metropolitan area run a higher risk of not only being involved in an accident but also of being the victim of vandalism or theft. Cities are congested with much more traffic than urban areas. The logic of prior-art risk-transfer is that the more cars that are used in an area, the more likely they are to hit or be hit by another car. Those drivers who live in an area that has less traffic will be considered less of a risk and that helps lower their risk-transfer ratings or premiums. Specific areas may further be specifically rated as being a high crime area. If a driver lives in such an area, the risk-transfer rating will be considered at a higher rate because the vehicle will be more likely to be involved in a theft. The less of a target a vehicle is, the lower the risk rating becomes. One way to help counteract this risk is to install an anti-theft mechanism in a vehicle such as an alarm system, power locks, door locks that require a code to be unlocked, or some other device that will help to deter thieves from attacking a car. Dependent on the risk-transfer system, such measures may help to decrease a certain risk rating. Any type of anti-theft protection that is installed in a vehicle will usually also be rewarded by a decrease to the car risk rating. Further, factors like condition and type of vehicle are considered, like newer vehicles are going to require more coverage than a second-hand vehicle, sports cars are expensive to manufacture which is why they are expensive to repair in case of an accident, and the like. In general, vehicles that have a lesser value will cost less to transfer their risks.

Many risk-transfer systems are also based on a credit history. As may be understood, that one of the main technical objects of risk-transfer systems is to balance the pooling of resources (e.g., premiums), which is performed typically in advance based on predicted occurrences of risk events, and the actual occurring risk events linked to actual losses to be covered. Therefore, unforeseen strikes in premiums will cause a not foreseen unbalance of the pooled resources to the actual losses, which may severely impact the operation of the risk-transfer system. However, the main reason in prior-art systems for using credit history data is to obtain information that will aid in evaluating "unobservable factors", such as carefulness in driving. For assessing risks by using credit history, prior-art risk-transfer systems assess either by a human expert or by appropriate data processing and filtering means a so-called "insurance score" for each potential insured by weighting certain characteristics from the driver's credit history, for example, delinquent loan payments and number, if any, of collection actions. The underlying credit record is obtained from large national credit information providers. The risk-transfer systems or the insurer, uses the score thus derived in combination with other factors to evaluate the driver's automobile risk-transfer rate.

From the above, it may be understood that traditional risk estimations and assessment by prior-art systems mainly employs statistically based structures by appropriate class factors, e.g., age, gender, marital status, number of driving years etc., such assessments necessarily lead to preferred class ratings with the corresponding deficiencies in providing the correct risk for a specific driver. Statistical based structures are always linked to mean values and means assumptions. However, it may be appreciated that not all teen drivers bear a higher risk, as for example drivers in the age of thirty. A very skilled driver may have a lower risk at a speed of 50 km/h, as another driver by 30 km/h on the same road. The deficiencies of the prior-art assumptions lay in the fact, that they contract all driver of a certain class to the means assumption of the class, while, in fact, this is only absolutely true for a very minor part of a certain class, while the predominant remaining members of the class typically are distributed in Poisson distribution around the means value, i.e., for this predominant remaining part, the assumption is more or less wrong leading to a probably unfair risk rating of the driver.

There could be argued, that using the driving history data, the prior-art systems allow a certain individualization, and therefore a correction of the deficiencies of their statistical based class structure. However, the driving history data are always historical data, which are interpolated to future behavior of the driver, presuming, that a driver always behave the same and that the environmental conditions always stay the same. In reality, this is not true. Drivers are aging, drivers may learn from situations, drivers may change their behavior, e.g., change the place of work or stop drinking, etc. The same applies, for example, to speeding ticket. The legal speed limits are normally put to a level, where driving is assumable save for all drivers (old/young, skilled/unskilled etc.). From the standpoint of the actual measurable risk associated with a driver, a very skilled driver having speeding tickets in his driving history may have a lower driving risk, that another driver with a proper driving history. For example, an overtake maneuver, performed at a higher speed and probably leading to a speed ticket may be associated with a much lower risk, that the same overtaking maneuver at a lower speed. Finally, the classifying filtering of drivers by their credit history is completely unrelated to the actual occurring measurable driving risk.

Therefore, the prior-art systems risk predictions and ratings are afflicted with major deficiencies in relation to the actual occurring driving risk. It is a high demand on measurement-based, reliable, automated risk assessment and risk-transfer systems in the field of automobile risk-transfer industry, considering both liability and comprehensive risk-transfer. The field of automobile risk-transfer is characterized by highly competitive pressure as well as high combined ratios and, hence, by low profitability. Thus, there is a high demand to provide automatable systems, even in the complex sector of physically measuring of typically (i.e., by prior-art systems) not measurable risks and system-based, automated risk-transfer.

Furthermore, many modern vehicles are incorporating at least partially Advanced Driver-Assistance Systems (ADAS) features to aid in the transport of drivers from one location to another. However, most of the prior-art risk assessment systems are not able to consider and assess effectiveness of ADAS features. In particularly, the systems are not able to physically measure the impact of the activation or deactivation of an ADAS features on the measured overall probability of an accident (risk) event to occur. Additionally, since many of the ADAS features can be activated or deactivated by the driver of a vehicle, the prior art systems are completely unable to effectively measure the occurring probability, moreover since this probability has a strong location dependency. Thus, the effective impacts of ADAS features cannot be measured and thus are not reflected in most prior art motor risk-transfer assessment systems and a possible consecutive pricings. In summary, though car makers invest a lot in safety technology, the impact of ADAS features is not properly considered by the prior-art risk-transfer technology. This is due to the applied backwards modelling (only) risk measuring structures, which have been mainly designed around demographic variables as well as basic vehicle characteristics (e.g., vehicle type, engine displacement, engine power). The problem with assessing autonomous vehicles is that not all autonomous vehicles are the same. This international standard for autonomous vehicles was defined in 2014 by the Society for Automotive Engineers International (SAE). It's based on six levels of classification from zero, for no automation, through to Level 5 for full automation.

Factually, it is evident that ADAS and other safety features may have a proven positive impact on accident frequency (i.e., reduction of accident frequency), making both cars and roads safer. However, ADAS features could not and still cannot technically properly considered in the risk measurements of most risk-transfer systems (i.e., not in a systematic, consistent way). There are two main reasons for the same. Normally, it is difficult to know what ADAS are installed in a given vehicle, since this requires access to detailed car/build data or on-board systems. Further, it is difficult to propagate the impact of ADAS in terms of claims frequency/severity (i.e., risk premium), since this requires deep and frequent interactions e.g., with the engineering/technical teams of automotive partners. This involves getting access to technical build data and understanding how the technology works in order to design the right assessment methodology and capture the ADAS effectiveness in a risk-measuring and risk-transfer context.

In summary, a lot in safety technology is not properly considered by the prior art systems in the risk-transfer technology and measuring systems. This is due to backwards modelling (only) risk models which have been designed around demographic variables as well as basic vehicle characteristics (e.g. vehicle type, engine displacement, engine power). The inventive ADAS risk score bridges the gap and provides the risk-transfer technology with the missing piece of information thanks to a scientific-based and technological-based methodology.

SUMMARY OF THE INVENTION

It is one object of the present invention to provide technical means to collect telematics data via mobile phone or mobile telematics devices, where in safety technology is properly considered, in particular by overcoming the disadvantages of the prior art systems due to backwards modelling (only) risk models which have been designed around demographic variables as well as basic vehicle characteristics (e.g. vehicle type, engine displacement, engine power). The inventive system should further be able to cope with the physical limits of the mobile devices in order to minimize both the information loss (potential car-relevant data) and the battery consumption. The system should provide the technical structure to allow implementation of appropriate logging strategies with defined measure and/or metric and/or KPI metrics. A measure herein is a defined technical and physically measurable quantification or indexing. A metric herein is a measure as a fundamental or unit-specific term but is beyond that directed performance directed measures. KPIs (Key Performance Indicator) are relevant measurable performance metrics that are measurable to the operation of devices or the same. Typically, KPIs are determined measuring over a specified time period, and compared against acceptable norms, past performance metrics or target measurement.

Further, it is one object of the present invention to provide mobile systems reacting, in real-time, dynamically on captured motion, environmental or operational parameters of mobile telematics devise and/or motor vehicles during operation, in particular allowing a user to dynamically and in real-time adapt vehicle's operation or driving risks by means of an automated risk-transfer engine allowing to dynamically select appropriate risk-transfer profiles based on monitoring, capturing and reacting on automotive parameters of motor vehicles during operation. More particular, it is an object of the present invention to extend the existing technology to a dynamic triggered and dynamically adjustable, multi-tier risk-transfer system based on a dynamic adaptable or even floating first-tier level risk-transfer, thereby reinforcing the importance of developing automated systems allowing self-sufficient, real-time reacting operation. Another object of the invention seeks to provide a way to technically capture, handle and automate dynamically adaptable, complex and difficult to compare risk transfer structures by the user and trigger operations that are related to automate optimally shared risks and transfer operations. Another object of the invention seeks to dynamically synchronize and adjust such operations to changing environmental or operational conditions by means of telematics data invasive, harmonized use of telematics between the different risk-transfer systems based on an appropriate technical trigger structure approach, thus making the different risk-transfer approaches comparable. In contrast to standard practice, the resource pooling systems of the different risk-transfer system shall create a comparable risk-transfer structure, allowing to optimize risk-transfer operation with the desired, technically based, repetitious accuracy that relies on technical means, process flow and process control/operation. Along the automated risk-transfer telematics value chain, there are many technologies offering individual elements, however, it is a further object of the present invention to provide a technical solution that is technically able to cover the whole range from device installation and data capturing to the automated and accurate risk measuring, analysis and management. Finally, it is a further object of the invention to provide a dynamic, expert scoring system based on real-time scoring and measurements, and further to provide a technically scalable solution based on scoring algorithms and data processing allowing to adapt and compare the signaling to other field of automated risk-transfer.

According to the present invention, these objects are achieved, particularly, with the features of the independent claims. In addition, further advantageous embodiments can be derived from the dependent claims and the related descriptions.

According to the present invention, the above-mentioned objects for the electronic risk measuring and scoring by measuring the impact of applied ADAS features to accident occurrence frequencies associated with a motor vehicles, data are achieved, particularly, in that, the electronic risk measuring and scoring system for motor vehicles provided with Advanced Driver-Assistance Systems (ADAS) features comprises a dynamic telematics circuit to aggregate telematics data from mobile telematics devices associated with a plurality of motor vehicles. The system also comprises an automotive risk-measuring system to: process the telematics data to generate an ADAS risk score measure, the ADAS risk score measure indicates an impact of ADAS features to an accident risk associated with the motor vehicle; and calibrate a user-specific rated risk-transfer, wherein the user-specific rated risk-transfer defines an impact of ADAS features in measures of risk-transfer claims frequency and severity. The electronic risk measuring and scoring system measures ADAS risk score as a measurable physical quantity measuring the effective real-world impact of activated ADAS features to the measured localized and time-dependent probability for the occurrence of an accident event associated with the motor vehicles, and in that a risk-transfer is user-specific rated and calibrated by the electronic risk measuring and scoring system capturing the impact of ADAS features in measures of risk-transfer claims frequency and severity. The present invention has, inter alia, the advantage that, it technically allows to measure a physical ADAS risk score measure as a risk-transfer typical rating factor, enabling to calibrated to users' specific portfolio, and to capture the impact of ADAS in terms of risk-transfer loss frequency and severity. Further, the present invention is able to provides an automated risk-transfer system for all kinds of applicable risk-transfer structures, as e.g. motor or product liability (re-)insurance systems and/or risk-transfer systems related to or depending on partially or fully automated vehicles. Also, the present invention provides a holistic and unified, automated technical approach for coverage to the motor vehicles in all different structures of risk-transfer, as e.g. product liability for car and/or technology manufacturer, driver liability cover. Further, the present invention also provides a holistic technical solution that covers the whole range from automotive control circuits and/or telematics devices and/or app installations to the automated and accurate risk measuring, analysis and management. Finally, it is able to provide a dynamic real-time scoring and appropriate physical measurements, and further provides a technically scalable solution based on scoring algorithms and data processing allowing to adapt the signaling to other fields of automated risk-transfer. The present invention, which is enhanced by contextual data, is able to provide best and highest optimized technical solution to the real-time adapted multi-tier risk-transfer system. It allows to capture and control the driver score behavior and compare its behavior within the technical operation and context. It allows to automatically capture risk's scores according to location and detected trip, and to automatically analyze and react on data related to the need of value added services, as e.g. accident notifications and/or feedback to the driver and/or automated fleet risk reporting and/or automated and dynamically optimized underwriting etc.). As embodiment variant, the score driving module can e.g. automatically capture scores risks according to a measured maintenance (e.g. maintenance failure by owner) and surveillance factor extracted from the automotive data associated with the motor vehicle or the use of active safety features. The telematics based feedback means of the system may e.g. comprise a dynamic alert feed via a data link to the motor vehicle's automotive control circuit, wherein the central, expert-system based circuit heads up device alerts drivers immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. The dynamic accident causation and accident risk measuring system provides the opportunities for risk-adaption and improvement dynamically and in real-time, i.e. as and when they happen, related to the motor vehicle's risk patterns (e.g. location, speed, etc.). Providing instant feedback to drivers through heads up training aids and get information sent straight to the mobile telematics device, ensures a two pronged approach to correcting risky (and often expensive) driving habits. Thus, the dynamic accident causation and accident risk measuring system not only allows to mutually optimize the operational parameters of the first and second risk transfer system, but also optimize the risk and/or risk behavior on the level of the risk exposed motor vehicles. No prior art system allows such an integral, real-time optimization. As another value added service, the automotive car system can e.g. dynamically generated fleet risk reports of selected motor vehicles. Such fleet reports, automatically generated by the automotive car system, provide a new approach to share and compare vehicles' statistics. The proposed invention with e.g. prefunding automotive enabled risk-transfer ((re) insurance) means will stimulate the carriers (first-tier risk-transfer systems) to provide its automotive data and claims' histories to the second-tier risk-transfer system in order to continually improve its scoring service, which in turn benefits carrier in helping reduce costs and combined ratio.

In summary, the present system provides mobile systems reacting, in real-time, dynamically on captured motion, environmental or operational parameters of mobile telematics devise and/or motor vehicles during operation, in particular allowing a user to dynamically and in real-time adapt vehicle's operation or driving risks by means of an automated risk-transfer engine allowing to dynamically select appropriate risk-transfer profiles based on monitoring, capturing and reacting on automotive parameters of motor vehicles during operation. The present automated system provides technical means where in safety technology is properly considered, in particular by overcoming the disadvantages of the prior-art systems due to backwards modelling (only) risk models which have been designed around demographic variables as well as basic vehicle characteristics (e.g., vehicle type, engine displacement, engine power).

ADAS risk score measure according to the present system, provides a measure for a risk-transfer rating factor, calibrated on a specific portfolio of a client, capturing the impact of ADAS in terms of measured insurance claims frequency and severity. The ADAS risk score measure may inter alia be used for: (1) Portfolio Profitability Analysis. The score allows to provide insights into a client's exposure to ADAS (descriptive analytics) as well as a set of advanced portfolio analyses highlighting the enhanced predictive power of a motor risk model. The system allows to provide potential impacts based on the ADAS risk score on a client's risk-transfer tariff and pricing strategy; and (2) Underwriting Factor. The ADAS risk score may be provided at point of quote. Through the inventive, automated, automotive portal, the ADAS risk score may be provided globally, at vehicle level and easily accessible in near-real time.

The above-mentioned objects for the electronic risk measuring and scoring system for measuring impact of applied ADAS features to accident occurrence frequencies associated with a motor vehicles, data are achieved, particularly, in that, the electronic risk measuring and scoring system measures an ADAS risk score measure measuring the impact of ADAS features to the accident risk associated with the motor vehicles, and in that a risk-transfer is user-specific rated and calibrated by the electronic risk measuring and scoring system capturing the impact of ADAS features in measures of risk-transfer claims frequency and severity. The present disclosure has, inter alia, the advantage that, it allows to measure an ADAS risk score measure as a risk-transfer typical rating factor, enabling to calibrated to users' specific portfolio, and to capture the impact of ADAS in terms of risk-transfer loss frequency and severity.

In an embodiment variant, the mobile telematics devices are associated with a plurality of cellular mobile devices. The present system provides technical means to collect telematics data via cellular mobile device or mobile telematics devices. Modern smartphones are more than calling devices and incorporate a number of high-end sensors that provide new dimensions to smartphone experience. Thus, the use of smartphones may be extended from the usual telecommunication field to applications in other specialized fields including transportation. Sensors embedded in the smartphones like Global Positioning System (GPS), accelerometer and gyroscope may collect data passively, which in turn may be processed to infer the travel mode of the smartphone user. This may help to solve many of the shortcomings associated with conventional travel survey devices and systems, including biased response, no response, erroneous time recording devices, etc. For example, the present system uses the sensors' data collected by smartphones or mobile telematics devices to extract various features for classification, including data frequency, moving temporal window size and proportion of data to be captured, are dealt with to achieve better results.

As an embodiment variant, the mobile telematics devices associated with the plurality of motor vehicles comprise one or more wireless or wired connections, and a plurality of interfaces for connection with at least one of a vehicle's data transmission bus, and/or a plurality of interfaces for connection with sensors and/or measuring devices, wherein, for providing the wireless connection, the mobile telematics device acts as a wireless node within a corresponding data transmission network by means of antenna connections of the mobile telematics device.

The present system can e.g. provide automated telematics-measurement-based risk-transfer, alert, and real-time notification systems for telematics associated with motor vehicles and wireless technology used in the context of telematics and automated trip measurements and recognition. This helps in a quick and easy set-up of the system without the hassle of modifying or altering other components of the motor vehicle or the like.

In an embodiment variant, the mobile telematics devices are connected to an on-board diagnostic system and/or an in-car vehicle interactive device, and wherein the mobile telematics devices capture usage-based and/or user-based and/or operation-based telematics data of the motor vehicle and/or user.

The present system also relates to mobile real-time systems reacting dynamically on captured environmental or operational parameters, in particular to telematics system's monitoring, capturing and reacting on motion parameters of motor vehicles during operation or mobile telematics devise in general, thereby measuring, detecting and identifying tips and trip segments of moving telematics devices.

In an embodiment variant, GPS points of the sets of motion status signals are at least partially enriched by measured additional sensory data measured by further sensors of the mobile telematics device and/or by sensory data measured by vehicle-based telematics sensors at any stage before transferring the sets of motion status signals to the dynamic telematics circuit.

Such dynamically captured telematics trip data may be of crucial importance for automatically managing or steering, for example, transportation infrastructure or to assign future facilities, and also provide basis for new systems realized for Transportation Demand Management (TDM).

In another embodiment variant, the automotive risk-measuring system comprises one or more first risk-transfer systems to provide a first risk-transfer based on first risk transfer parameters from a plurality of selected motor vehicles to one of the first risk-transfer systems, wherein the first risk transfer parameters are at least partially generated based upon the output signal generation steered and/or adapted by measured trip or trip-segment and risk measure parameters based on the telematics data, wherein the first risk-transfer systems comprise a plurality of payment transfer modules configured to receive and store first payment parameters associated with risk-transfer of risk exposures of said motor vehicles for pooling of their risks, and that the automotive risk-measuring system comprises a second risk-transfer system to provide a second risk-transfer based on second risk-transfer parameters from one or more of the first risk-transfer systems to the second risk-transfer system, wherein the second risk-transfer system comprises second payment transfer modules configured to receive and store second payment parameters for pooling of the risks of the first risk-transfer systems associated with risk exposures transferred to the first risk-transfer systems, in that by means of a vehicle-telematics driven aggregator of the dynamic telematics circuit associated with the second risk-transfer system risk-related usage-based and/or user-based telematics data captured from the mobile telematics devices are triggered and monitored by means of telematics data-based triggers in the dataflow pathway of the mobile telematics devices, in that the dynamic telematics circuit associated with the second risk-transfer system further comprises a driving score module measuring and/or generating a single or a compound set of variable scoring parameters profiling the use and/or style and/or environmental condition of driving during operation of the motor vehicle based upon the captured, triggered and monitored risk-related usage-based and/or user-based and/or operational telematics data, in that by means of the dynamic telematics circuit associated with the second risk-transfer system a shadow request is transmitted to at least one of the first risk-transfer systems decentrally connected to the dynamic telematics circuit over a data transmission network, wherein the shadow request comprises at least said single or a compound set of variable scoring parameters and/or risk-relevant parameters based upon the captured, triggered and monitored risk-related usage-based and/or user-based and/or operational telematics data, and in that in response to the transmitted shadow request individualized risk-transfer profiles based upon the dynamically collected single or compound set of variable scoring parameters are transmitted from at least one first risk-transfer systems to a corresponding motor vehicle and issued by means of an interface of the mobile telematics devices for selection by the driver of the motor vehicles.

The present system provides means for reacting, in real-time, dynamically on captured motion, environmental or operational parameters of mobile telematics devise and/or motor vehicles during operation, in particular allowing a user to dynamically and in real-time adapt vehicle's operation or driving risks by means of an automated risk-transfer engine allowing to dynamically select appropriate risk-transfer profiles based on monitoring, capturing and reacting on automotive parameters of motor vehicles during operation. More particularly, the present system extends the existing technology to a dynamic triggered and dynamically adjustable, multi-tier risk-transfer system based on a dynamic adaptable or even floating first-tier level risk-transfer, thereby reinforcing the importance of developing automated systems allowing self-sufficient, real-time reacting operation.

In an implementation form, the driving score module of the dynamic telematics circuit comprises a trigger for triggering and automatically selecting scores driver parameters based on defined scores driver behavior pattern by comparing captured telematics data with the defined scores driver behavior pattern.

The present system provides a way to technically capture, handle and automate dynamically adaptable, complex and difficult to compare risk transfer structures by the user and trigger operations that are related to automating optimally shared risks and transfer operations. The present system further seeks to dynamically synchronize and adjust such operations to changing environmental or operational conditions by means of telematics data invasive, harmonized use of telematics between the different risk-transfer systems based on an appropriate technical trigger structure approach, thus making the different risk-transfer approaches comparable. In contrast to standard practice, the resource pooling systems of the different risk-transfer systems may create a comparable risk-transfer structure, allowing to optimize risk-transfer operation with the desired, technically based, repetitious accuracy that relies on technical means, process flow, and process control/operation.

In an embodiment variant, the driving score module automatically captures scores risks according to the measured location or trip of the motor vehicle based on the captured telematics data of the mobile telematics devices associated with the motor vehicles.

The present system provides a technical solution that is able to cover automated data capturing for accurate occurrence probability measurements (risk measurements), analysis and management, and provide a dynamic, measuring-data-based scoring system based on real-time scoring and measurements, and further to provide a technically scalable solution based on scoring algorithms and data processing allowing to adapt and compare the signaling to other field of automated risk-transfer.

In an embodiment variant, by means of the dynamic telematics circuit, the shadow request is transmitted to a corresponding first risk-transfer system, if transmission of the shadow request is permitted by means of an access control unit of the mobile telematics device, wherein the single or a compound set of variable scoring parameters are generated by means of the driving score module associated with the second risk-transfer system.

Thereby, the automotive car system may e.g., dynamically generate fleet risk reports of selected motor vehicles. Such fleet reports, automatically generated by the automotive car system, provide a new approach to share and compare vehicles' statistics. The present system with e.g., prefunding automotive enabled risk-transfer ((re)insurance) means may stimulate the carriers (first-tier risk-transfer systems) to provide its automotive data and claims' histories to the second-tier risk-transfer system in order to continually improve its scoring service, which in turn benefits carrier in helping reduce costs and combined ratio.

In an embodiment variant, the access control unit of the mobile telematics device comprises a definable distribution table comprising a variable list with at least one first risk-transfer system, wherein the transmission of the shadow request to a specific first risk-transfer system depends on the definable distribution table of the access control unit of the mobile telematics device.

Such table with stored categorization trigger parameters for triggering a predefined level of scores allows providing a new and unified approach for automated risk-transfer for risk associated with risk-exposed motor vehicles, considering dynamically measured, usage-based parameters, allowing a new optimization in the level of the risk-exposed vehicle as well as on the level of the operational pooling of risk-exposure of the first and/or second risk-transfer system in the risk assessment context.

In a further embodiment variant, an individualized risk-transfer profile of a first risk-transfer system is only issued by means of a display of the cellular mobile device for selection by the driver of the motor vehicles if the issuance is permitted by means of an access control unit of the electronic logging and track detection system.

Thus, the present system may generate individualized risk-transfer profiles and also exclusively be used for automatically providing and activating adapted and/or specifically selected value-added services, as, for example, accident notifications and/or feedback to the motor vehicle or driver and/or automated fleet risk reporting and/or automated and dynamically optimized underwriting, etc. Thus, the present system allows an adaption of the risk of the first risk-transfer tier or system as well as risk on level of the insured motor vehicles (e.g., by risk-based driver feedback in real-time) and/or the second risk-transfer tier or system.

In another embodiment variant, the single or compound set of variable scoring parameters profiling the use and/or style and/or environmental condition of driving during operation of the motor vehicle and generated by means of the driving score module at least comprise scoring parameters measuring a driving score and/or a contextual score and/or a vehicle safety score.

This allows providing an operationally real-time-adapted multi-tier risk-transfer system. Further, it allows to automatically capture and/or control the score driving behavior (also in the sense of location, time, road etc. of the driving), and compare its behavior within the technical operation and context. This also allows to automatically capture score risks according to location and/or detected trip, and to automatically analyze and react on data related to the need of added services, as, for example, accident notifications.

In an embodiment variant, the measured driving scoring parameter is at least based upon a measure of driver behavior parameters comprising the dynamically measured and detected trip or trip segment. That is, the present system is capable of capturing different kinds of telematics data, e.g., trips or trip segments and driving patterns from the motor vehicles and/or automation level of the motor vehicle (driving itself partially or fully autonomous (auto piloting)) and/or if the user is intervening with its automated or safety features, and accordingly define the variable driving scoring parameter.

In an embodiment variant, the captured contextual measuring parameters are at least based upon measured trip score parameters based on road type and/or a number of intersection and/or tunnels and/or elevation, and/or measured time of travel parameters, and/or measured weather parameters and/or measured location parameters, and/or measured distance driven parameters.

The present system, which is enhanced by said contextual data, is able to provide the best and highest optimized technical solution to the real-time adapted multi-tier risk-transfer system. This allows to capture and control the driver score behavior and compare its behavior within the technical operation and context. This further allows to automatically capture risk's scores according to location and detected trip, and to automatically analyze and react on data related to the need of value added services, as, for example, accident notifications and/or feedback to the driver and/or automated fleet risk reporting and/or automated and dynamically optimized underwriting etc.).

In an embodiment variant, an electronic risk measuring and scoring method for motor vehicles provided with Advanced Driver-Assistance Systems (ADAS) features is described. The said method comprises: aggregating telematics data from mobile telematics devices associated with a plurality of motor vehicles; processing the telematics data to generate an ADAS risk score measure, the ADAS risk score measure indicates an impact of ADAS features to an accident risk associated with an automobile device a motor vehicle; and calibrating a user-specific rated risk-transfer, wherein the user-specific rated risk-transfer defines an impact of ADAS features in measures of risk-transfer claims frequency and severity.

As discussed in context of the present system, the present electronics-based method provides technical means, wherein the effective impact of activation of different safety technologies and features on the occurrence probability of accident events can be properly measured, in particular by overcoming the disadvantages of the prior-art systems due to backwards modelling (only) risk models which have been designed around demographic variables as well as basic vehicle characteristics (e.g., vehicle type, engine displacement, engine power).

The foregoing general description of the illustrative embodiments and the following detailed description thereof are merely exemplary aspects of the teachings of this disclosure and are not restrictive.

BRIEF DESCRIPTION OF THE DRAWINGS

The present invention will be explained in more detail, by way of example, with reference to the drawings in which:

FIG. 9 exemplarily show RBD of Stand-by System Composed of Uni-Component of Driver, Vehicle Equipped with ADAS Systems and Passive Systems (structure 1).

FIG. 11 shows RBD of Stand-by System Composed of Multi-Components of Driver (Series), ADAS Warning Systems (Parallel), ADAS Crash Avoidance Systems (Parallel) & Passive Systems (Parallel) (structure 3).

DETAILED DESCRIPTION OF THE PREFERRED EMBODIMENTS

Figure 1:
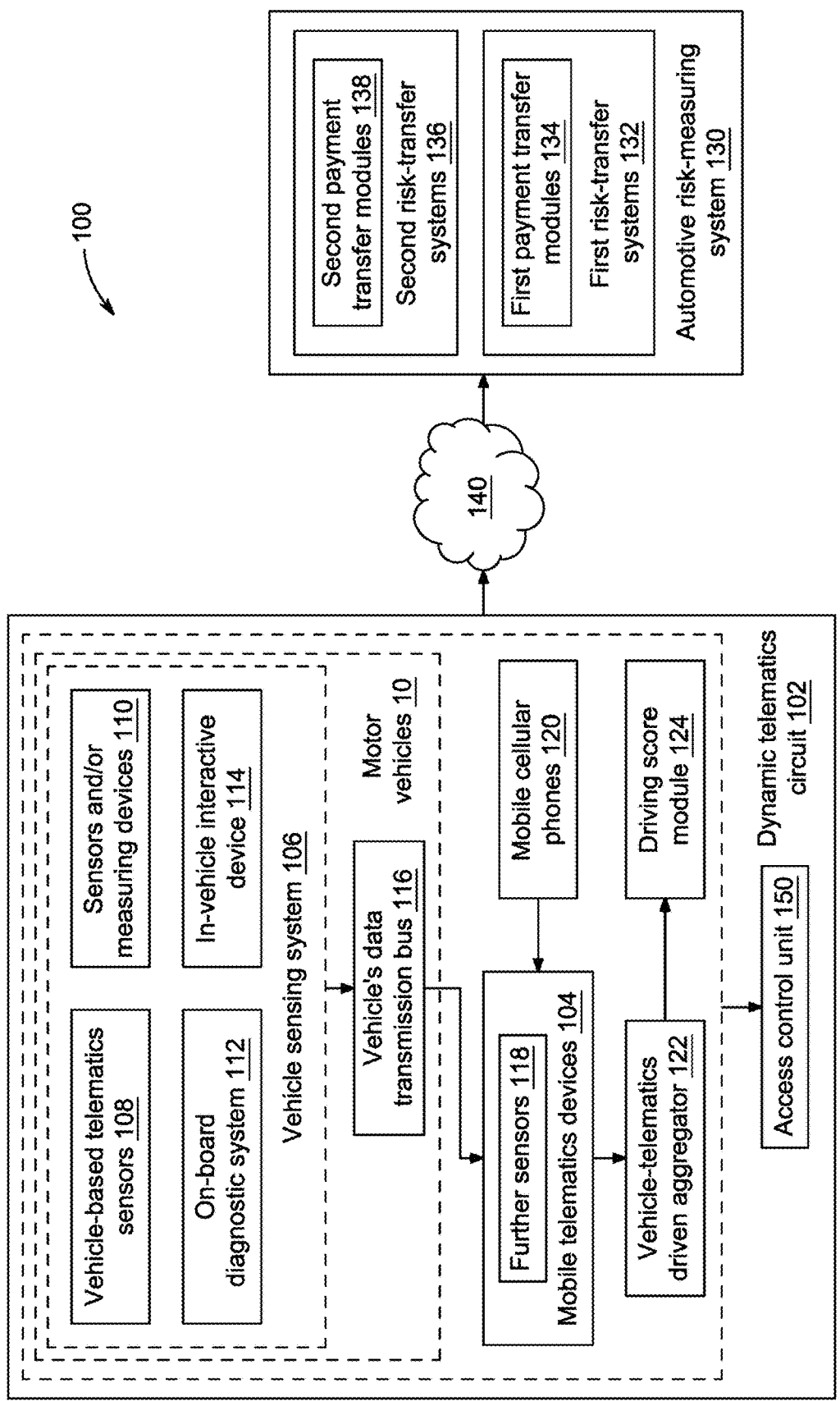
FIG. 1 is a schematic block diagram illustrating an exemplary electronic risk measuring and scoring system for motor vehicles provided with Advanced Driver-Assistance Systems (ADAS) features, according to certain embodiments.

In the drawings, like reference numerals designate identical or corresponding parts throughout the several views. Further, as used herein, the words "a," "an" and the like generally carry a meaning of "one or more," unless stated otherwise. Furthermore, the terms "approximately," "approximate," "about," and similar terms generally refer to ranges that include the identified value within a margin of 20%, 10%, or preferably 5%, and any values therebetween.

Aspects of this disclosure are directed to the technical field of autonomous vehicle driving, and in particular to measuring systems measuring real-time measuring parameters associated with motor vehicles in the field of autonomous vehicle driving or Advanced Driver-Assistance Systems (ADAS) systems, in particular measuring time-dependent localized occurrence probabilities and frequencies of physical events having an impact, in particular a loss generating impact, on the motor vehicle, which is denoted herein as measurable accident risk. The present disclosure allows to measure a single score or index measure, denoted herein as ADAS risk score (measure), reflecting the impact of the activation of technical ADAS features equipping a vehicle during the operation of the motor vehicle at a certain location and time to the measured occurrence probability of a loss impacting accident event, in particular on occurring loss frequency and severity of an impact. According to the present disclosure, ADAS risk score measure provides a measure for a risk-transfer rating factor, calibrated on a client's specific portfolio, capturing the impact of ADAS in terms of measured impact frequency and severity. The impact of the accident event can also be expressed in monetary amount resulting in a risk-transfer claim.

Figure 7:
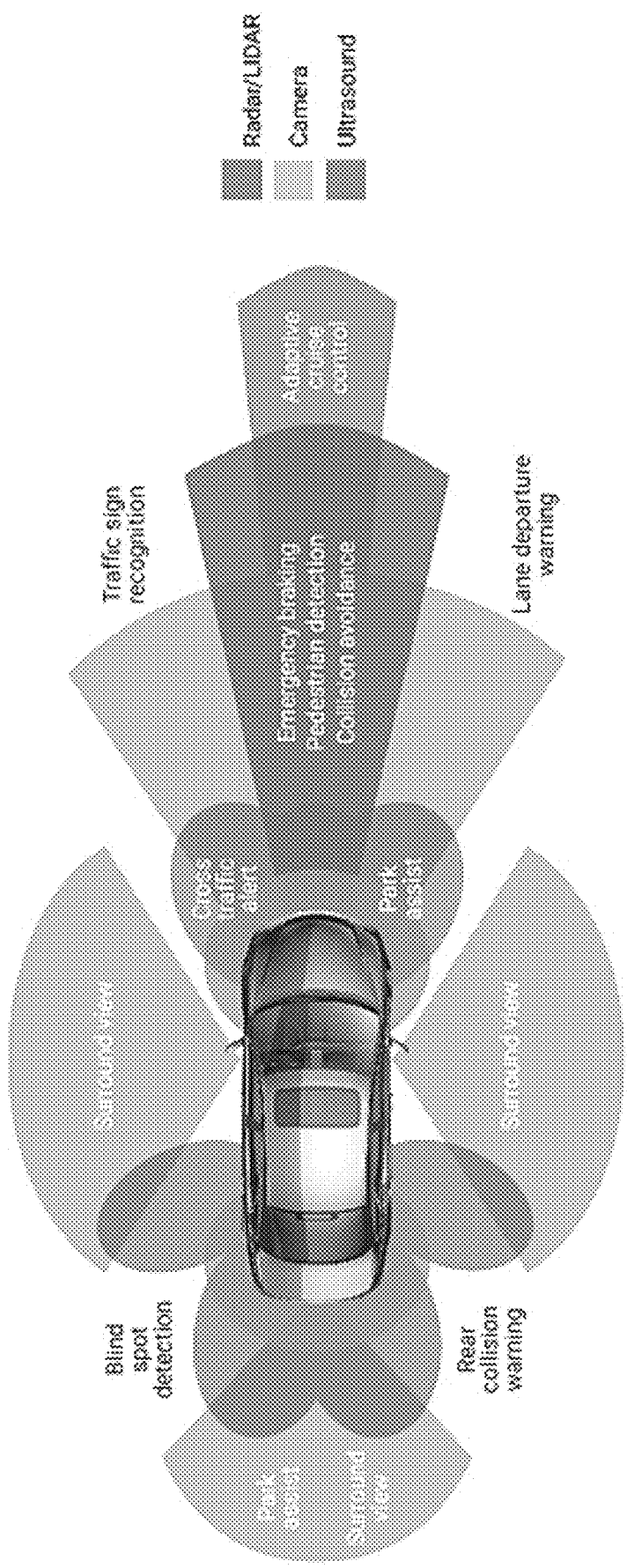
FIGS. 7 and 8 are diagrams schematically illustrating exemplary Advanced Driver-Assistance Systems (ADAS) 20, inter alia, assisting drivers in driving and parking functions. Electronic ADAS systems 20 can e.g. comprise systems for automatic emergency braking, lane and highway assistance, and driver monitoring etc.
Figure 8:
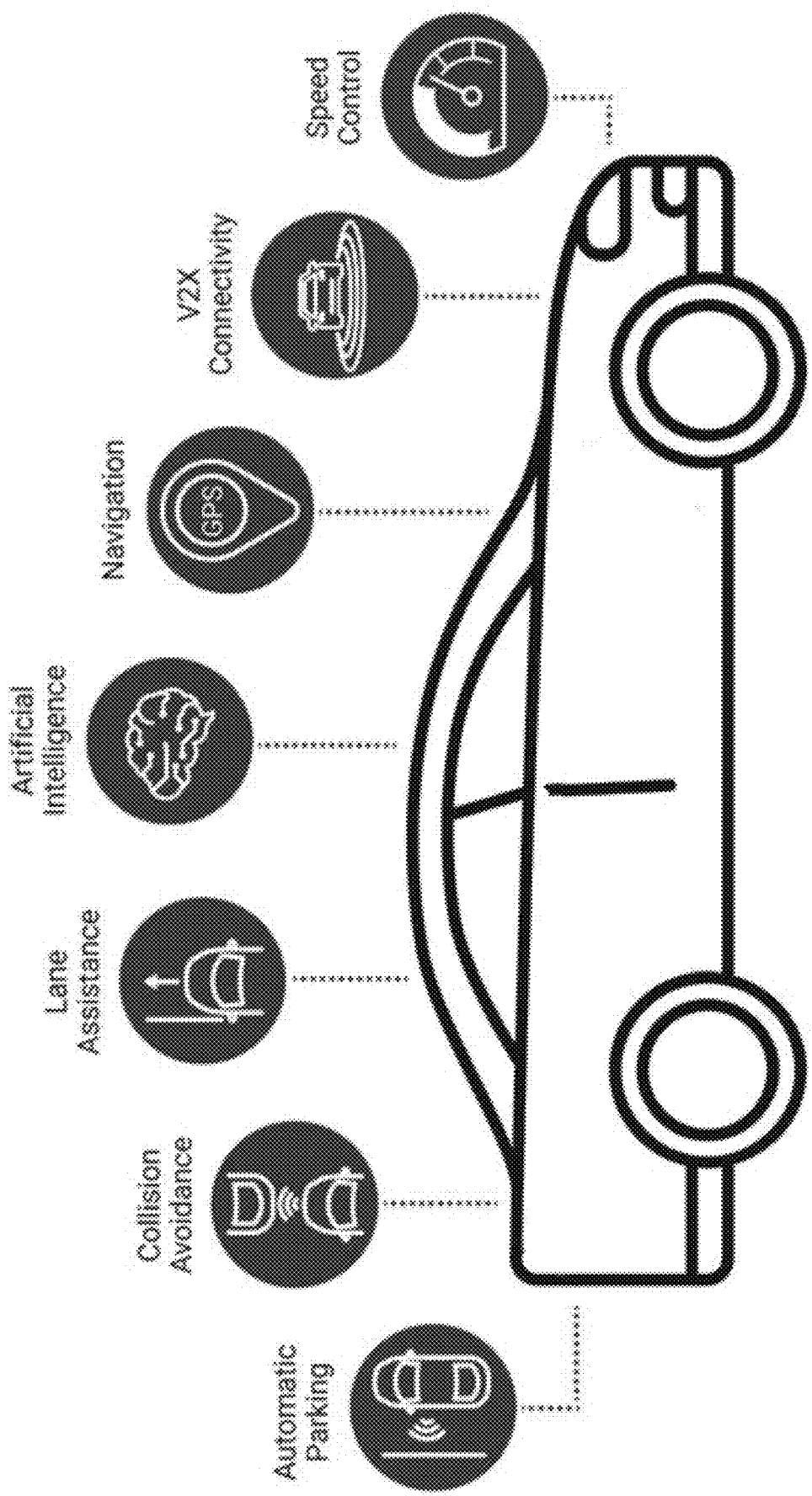

FIG. 1 schematically illustrates a block diagram of an electronic system 1 for forward-looking measurements of frequencies of accident occurrences based on localized automotive device measurements (hereinafter, generally, referred to as "system 1"). The present system 1 is implemented for motor vehicles (generally represented by the reference numeral 10) provided with Advanced Driver Assistance Systems ADAS features 200. Further, for the purposes of the present disclosure, the motor vehicle 10 (also simply referred to as "vehicle") may be any suitable type of vehicle including, but not limited to, cars (including internal combustion engine based cars, electric cars or hybrid cars), buses, motorcycles, off-road vehicles, light trucks, and regular trucks, without any limitations. Herein, Advanced Driver-Assistance Systems (ADAS) 200 are electronic technologies that assist drivers in driving and parking functions or the like, inter alia, comprising ADAS electronic systems 200 for automatic emergency braking, lane and highway assistance, and driver monitoring etc., as FIGS. 7 and 8 exemplarily illustrate. ADAS 200 use automated technology and measuring devices, such as sensors and cameras 108/110, to detect nearby obstacles or driver errors and respond accordingly. Primarily, motor vehicles with ADAS features 10 may detect certain objects, do basic classification, initiate alert signaling to the driver e.g. of hazardous road conditions and, in some cases, automatically decelerate or stop the vehicle. By connecting the ADAS 200 to a telematics system (as will be discussed later in the disclosure), it is possible to capture the vehicle events within a fleet system and implement a driver-monitoring structure 20084. ADAS features 200 may include, but not limited to, adaptive cruise control 2001, glare free high beam and pixel light 2002, anti-lock braking system 2003, automatic parking 2004, automotive navigation system 2005, automotive night vision 206, blind spot detection system 2007, collision avoidance system 208, crosswind stabilization 2009, intelligent speed adaptation 2010, lane centering 2011, lane departure warning system 2012, lane change assistance system 2013, surround view system 2014, tire pressure monitoring 215, etc. Essential safety-critical ADAS applications typically include systems for pedestrian detection/avoidance 2008, lane departure warning/correction 2011, . . . , 2013, traffic sign recognition 2016, automatic emergency braking 20082, blind spot detection 2007. The ADAS features can by realized using mobile-connected devices, and e.g. operate as autonomous application systems partitioned into various chips, as e.g. SoCs (Systems on a Chip). These chips connect sensors to actuators through interfaces and high-performance ECUs (electronic controller units). SoCs are realized by an integrated circuit that typically can integrate all or most components of a ADEAS electronic system. These components can e.g. include a central processing unit (CPU), memory, input/output ports and secondary storage, e.g. alongside other components such as radio modems and a graphics processing unit (GPU)—all on a single substrate or microchip. It may contain digital, analog, mixed-signal, and/or radio frequency signal processing functions (otherwise ADAS systems can also be realized simply using application processors etc.). ADAS systems, as e.g. also used in self-driving cars, can use a variety of the mentioned technologies to gain 360-degree vision, both near (in the vehicle's immediate vicinity) and far. Typically, hardware designs try to use more advanced process nodes to meet ever-higher performance targets while simultaneously reducing demands on power and footprint. Please, note that significant automotive safety improvements in the past (e.g., shatter-resistant glass, three-point seatbelts, airbags) are all passive safety measures designed to minimize injury during an accident. In contrast, ADAS systems actively improve safety with the help of embedded vision, thus, reducing the occurrence of accidents and injury to occupants in a new way and having a new contribution to the measured occurrence and severity rates. Artificial Intelligence systems (AI) can e.g. be used in combination with the ADAS features. The implementation of cameras in the vehicle can e.g. involves such AI-functions using sensor fusion to identify and process objects. Sensor fusion, similar to the human brain process information, technically combines large amounts of data with the help of image recognition software, ultrasound sensors, lidar, and radar. This technology is physically able respond faster than a human driver ever can. AI-based technologies can analyze streaming video in real time, recognize what the video shows, and determine how to react to it.

Some of the ADAS systems 20 are discussed in the following more detailed: (A) Adaptive Cruise Control 201: Adaptive cruise control (ACC) can have a particular impact on highways, where drivers can find it difficult to monitor their speed and other cars over a long period of time. Advanced cruise control can automatically accelerate, slow down, and at times stop the vehicle, depending on the actions other objects in the immediate area; (B) Glare-Free High Beam and Pixel Light 202: Glare-free high beam and pixel light 202 uses sensors to adjust to darkness and the vehicle's surroundings without disturbing oncoming traffic. The headlight systems detect the lights of other vehicles and redirects the vehicle's lights away to prevent other road users from being temporarily blinded; (C) Adaptive Light Control 217: Adaptive light control adapts the vehicle's headlights to external lighting conditions. It changes the strength, direction, and rotation of the headlights depending on the vehicle's environment and darkness; (D) Automatic Parking 204: Automatic parking helps inform drivers of blind spots, so they know when to turn the steering wheel and stop. Vehicles equipped with rearview cameras have a better view of their surroundings than traditional side mirrors. Some systems can even complete parking automatically without the driver's help by combining the input of multiple sensors; (E) Autonomous Valet Parking 2041: Autonomous valet parking works via vehicle sensor meshing, 5G network communication, with cloud services that manage autonomous vehicles in parking areas. The vehicles sensors provide the vehicle with information about where it is, where it needs to go, and how to get there safely. All this information is methodically evaluated and used to perform drive acceleration, braking, and steering until the vehicle is safely parked; (F) Automotive night vision 206: In general, night vision systems enable drivers to see things that would otherwise be difficult or impossible to see at night. An automotive night vision system can e.g. use a thermographic camera to increase a driver's perception and seeing distance in darkness or poor weather beyond the reach of the vehicle's headlights. This technology is based on the night vision devices (NVD), which generally denotes any electronically enhanced optical devices operate in three modes: image enhancement, thermal imaging, and active illumination. The automotive night vision system is a combination of NVDs such as infrared cameras, GPS, Lidar, and Radar, among others to sense and detect objects. There are two categories of night vision systems: Active night vision systems project infrared light, and passive systems rely on the thermal energy that comes from cars, animals, and other objects; (G) Navigation System 205: Car navigation systems provide on-screen instructions and voice prompts to help drivers follow a route while concentrating on the road. Some navigation systems can display exact traffic data and, if necessary, plan a new route to avoid traffic jams. Advanced systems may also e.g. offer Heads Up Displays (HuD) to reduce driver distraction; (H) Blind Spot Monitoring 207: Blind spot detection systems use sensors to provide drivers with important information that is otherwise difficult or impossible to obtain. Some systems sound an alarm when they detect an object in the driver's blind spot, such as when the driver tries to move into an occupied lane; (I) Automatic Emergency Braking 20082: Automatic emergency braking uses sensors to detect whether the driver is in the process of hitting another vehicle or other objects on the road. These systems can measure the distance of nearby traffic and alert the driver to any danger. Some emergency braking systems can take preventive safety measures, such as tightening seat belts, reducing speed, and adaptive steering to avoid a collision; (J) Crosswind Stabilization 209: These ADAS systems are able to supports the vehicle in counteracting strong crosswinds. The sensors in these systems can detect strong pressure acting on the vehicle 10 while driving and apply brakes to the wheels affected by crosswind disturbance; (K) Driver Drowsiness Detection 20083: Driver drowsiness detection 20083 warns drivers of sleepiness or other road distractions. There are several ways to technically determine whether a driver's attention is decreasing. For example, sensors can analyze the movement of the driver's head, and heart rate to determine whether they indicate drowsiness. Other systems can e.g. issue driver alerts similar to the warning signals for lane detection; (L) Driver Monitoring System 20084: A driver monitoring system 20084 is another way of measuring the driver's attention. The camera sensors can e.g. analyze whether the driver's eyes are on the road or drifting. Driver monitoring systems can alert drivers with noises, vibrations in the steering wheel, or flashing lights. In some cases, the car will take the extreme measure of stopping the vehicle completely; (M) 5G and V2X 217: The 5G ADAS features, with increased reliability and lower latency, provides communication between the vehicle and other vehicles or pedestrians, referred to as V2X (Vehicle-to-Everything). V2X denotes traffic networking technology, also called Car2x, with its variants Vehicle-to-Vehicle (V2V), Vehicle-to-Road (V2R), Vehicle-to-Infrastructure (V21), Vehicle-to-Network (V2N) and Vehicle-to-Person (V2P).

Traffic networking systems are based on the sum of all traffic participants, i.e. the traffic network. Technical objects of the V2X-technology are to increase traffic safety, transport efficiency and energy savings. Such a network can be required for autonomous driving. When looking on a complete traffic network and network dynamics, millions of vehicles can be connected to cellular networks for real-time navigation. V2X, in particular 5G V2X can used to enhance existing methods and the cellular network to improve situational awareness, control or suggest speed adjustments to account for traffic congestion, and update GPS maps with real-time updates. V2X is essential to support over-the-air (OTA) software updates for the now-extensive range of software-driven systems in cars, from map updates to bug fixes to security updates and more.

As illustrated, system 100 includes a dynamic telematics circuit 102, also referred to as "telematics circuit" or sometimes "dynamic trip-detection telematics circuit." The dynamic telematics circuit 102 represents a collection of various telematics components used to monitor driving behavior, speed patterns, distance traveled and driving environment to assess the level of protection, and the like. Herein, the term "telematics" is used to describe vehicle onboard communication services and applications that communicate with one another via receivers and other telematics devices. For the purposes of the present disclosure, the telematics data captured may include, e.g., but not limited to, location, speed, idling time, harsh acceleration or braking, fuel consumption, vehicle faults, and more. When analyzed for particular events and patterns, this information may provide in-depth insights across an entire fleet. Further, as illustrated, the dynamic telematics circuit 102 includes mobile telematics devices 104 (sometimes referred to as "telematics devices"). The term 'telematics device' as used herein may generally refer to any appropriate device that is adapted to send, receive, and store information via telecommunication devices. In addition, mobile telematics devices 104 may be configured to store and/or send data associated with a condition of the vehicle. The mobile telematics devices 104 may be adapted to be used with the vehicle. The mobile telematics devices 104 may be in the form of plug-in or integrated vehicle informatics and telecommunication devices capable of remote communication. That is, a mobile telematics device 104 (or alternatively referred to as mobile telematics devices 104) may be an independently purchasable device that is configured to be attached to and/or detached from the vehicle as desired. For example, the mobile telematics device 104 may be attached to an onboard diagnostics (OBD) port of the vehicle to receive data associated with the vehicle from the vehicle bus. In another example, the mobile telematics devices 104 may be integrated with the vehicle. For example, the mobile telematics device 104 may be a Global Positioning System technology integrated with computers and mobile communications technology present in automotive navigation and internal network systems, such as OnStar®.

Figure 2:
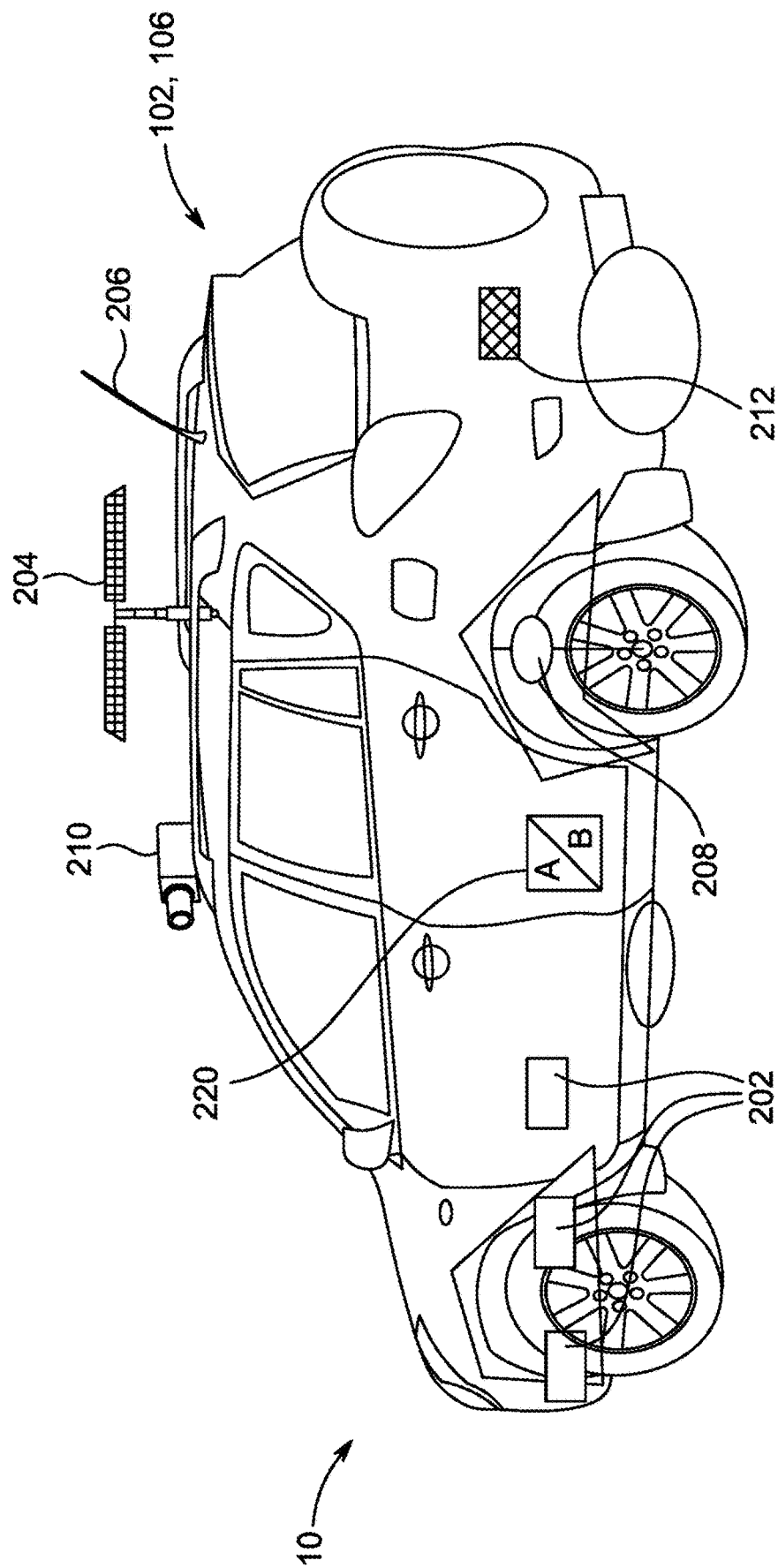
FIG. 2 is an exemplary illustration of a motor vehicle provided with a dynamic telematics circuit for implementation of the system of FIG. 1, according to certain embodiments.

Further, as illustrated in FIG. 2, in the present examples, a vehicle sensing system 106 may be a part of the dynamic telematics circuit 102 of the motor vehicle 10. The vehicle sensing system 106 may be disposed in signal communication with the mobile telematics devices 104, in the dynamic telematics circuit 102. The vehicle sensing system 106 may generally be defined to include all sensing means that may be part of the vehicle. The vehicle sensing system 106 may include vehicle-based telematics sensors 108, sensors and/or measuring devices 110, on-board diagnostic system 112, and in-vehicle interactive device 114. The vehicle-based telematics sensors 108 and the sensors and/or measuring devices 110 of the motor vehicle may include proprioceptive sensors for sensing operating parameters of the motor vehicle and/or exteroceptive sensors for sensing environmental parameters during operation of the motor vehicle. The exteroceptive sensors or measuring devices may, for example, include at least radar devices 202 for monitoring surrounding of the motor vehicle 10 and/or LIDAR devices 204 for monitoring surrounding of the motor vehicle 10 and/or global positioning systems 206 or vehicle tracking devices for measuring positioning parameters of the motor vehicle 10 and/or odometrical devices 208 for complementing and improving the positioning parameters measured by global positioning systems or vehicle tracking devices and/or computer vision devices 210 or video cameras for monitoring the surrounding of the motor vehicle 10 and/or ultrasonic sensors 212 for measuring the position of objects close to the motor vehicle 10. The proprioceptive sensors (generally represented by reference numeral 220) or measuring devices for sensing operating parameters of the motor vehicles 10 may include motor speed measuring device 222 e.g. measuring revolutions per minute (rpm), i.e. the number of turns per minute and/or wheel load 224 and/or heading 226 and/or battery status 228 and/or speedometer 230 of the motor vehicles 10, and the like. The vehicle sensing system 106 may also include further sensors 118, which may be part of the mobile telematics devices 104. Such further sensors 118 may include, but not limited to, a GPS module (Global Positioning System) 1181 and/or geological compass module 1182 based on a 3-axis teslameter and a 3-axis accelerometer 1183, and/or gyrosensor or gyrometer 1184, and/or a MEMS accelerometer sensor 1185 comprising a consisting of a cantilever beam with the seismic mass as a proof mass measuring the proper or g-force acceleration, and/or a MEMS magnetometer or a magneto-resistive permalloy sensor 1186 or another three-axis magnetometers 1187. Further, the on-board diagnostic system 112 is a computer system, generally, inside the vehicle that tracks and regulates a vehicle's performance. The on-board diagnostic system 112 collects information from the network of sensors inside the vehicle, which the system may then use to regulate car systems or alert the user to problems. Also, the in-vehicle interactive devices 114 are ubiquitous electronic devices provided in the vehicles to provide valuable services to drivers and passengers, such as collision warning systems 2008, assist drivers in performing the primary task in a vehicle that is driving; others provide information on myriad subjects or entertain the driver and passengers.

The mobile telematics devices 104 associated with the plurality of motor vehicles can e.g. comprise one or more wireless or wired connections, and a plurality of interfaces 1041 for connection with at least one of a vehicle's data transmission bus (represented by the reference numeral 116), and/or a plurality of interfaces for connection with sensors and/or measuring devices 106/108/110/118. The one or more wireless connections or wired connections of the mobile telematics devices 104 may include Bluetooth (IEEE 802.15.1) or Bluetooth LE (Low Energy) as wireless connection for exchanging data using short-wavelength UHF (Ultra high frequency) radio waves in the ISM (industrial, scientific and medical) radio band from 2.4 to 2.485 GHz by building a personal area network (PAN) with the on-board Bluetooth capabilities and/or 3G and/or 4G and/or GPS and/or Bluetooth LE (Low Energy) and/or BT based on Wi-Fi 802.11 standard, and/or a contactless or contact smart card, and/or a SD card (Secure Digital Memory Card) or another interchangeable non-volatile memory card. Herein, the data transmission may take place using standard wired network, including a fiber or other optical network, a cable network; or alternatively using wireless networks such as wireless local area networks (WLANs) implementing Wi-Fi standards, Bluetooth standards, Zigbee standards, or any combination thereof. In particular, the mobile telematics devices 104 may provide mobile telecommunication networks as, for example, 3G, 4G, 5G LTE (Long-Term Evolution) networks or mobile WiMAX or other GSM/EDGE and UMTS/HSPA based network technologies, etc., and more particular with appropriate identification means as SIM (Subscriber Identity Module), etc.

Further, the term 'vehicle data transmission bus,' 116 as used herein may generally refer to any appropriate internal communications network of a vehicle that interconnects components inside the vehicle. The internal communications network of the vehicle may allow microcontrollers and devices such as engine control unit, transmission control unit, anti-lock braking system, body control modules, other sensors, etc., that are already present in the vehicle to communicate with each other within the vehicle. The internal communication network, the microcontroller, and the devices of the vehicle may operate in concert to collect, handle, and maintain any appropriate data associated with a condition of the vehicle, such as fuel level data of the vehicle, brake fluid level, engine status, and so on. The different vehicle bus protocols may include, but are not limited to, Controller Area Network (CAN), Local Interconnect Network (LIN), Domestic Digital Bus (D2B), FlexRay, DC-BUS, IEBus, Media Oriented Systems Transport (MOST), SMARTwireX, and so on. In some examples, the data collected, handled, and/or maintained by the vehicle bus may be obtained by connecting to the vehicle bus via an on-board diagnostics (OBD) connector. One of ordinary skill in the art may understand and appreciate that the list of example devices, microcontrollers, and data collected and maintained by the vehicles internal communication network is not exhaustive.

For providing the wireless connection 10411, the mobile telematics device 104 can e.g. act as a wireless node 1042 within a corresponding data transmission network 140 by means of antenna connections of the mobile telematics device 104. The mobile telematics devices 104 may provide the one or more wireless connections 10411 by means radio data systems (RDS) modules 104111 and/or positioning system including a satellite receiving module 104112 and/or a cellular mobile device module/GSM-module 140113 including a digital radio service module 104114 and/or a language unit in communication the radio data system or the positioning system or the cellular telephone module. The satellite receiving module 104112 may include a GPS circuit and/or the digital radio service module 104114 may include at least a Global System for Mobile Communications (GSM) unit. A data link may be set by means of the wireless connection of the mobile telematics devices 104 over a mobile telecommunication network between the mobile telematics devices 104 as client and the vehicle sensing system 106. The mobile telematics devices 104 may act as a wireless node 1042 within said mobile telecommunication network, in particular cellular mobile telephone network. Further, the plurality of interfaces 1041 of the mobile telecommunication apparatus for connection with at least one of a motor vehicle's data transmission bus 116 may include at least one interface for connection with a motor vehicle's Controller Area Network (CAN) bus, e.g., in connection with on-board diagnostics (OBD) port, or other connection, e.g., for the battery installed devices, or also OEM (Original Equipment Manufacturer) installed systems getting information access to on-board sensors or entertainment systems (as, for example, Apple Carplay, etc.) providing the necessary vehicle sensor information.

Figure 3:
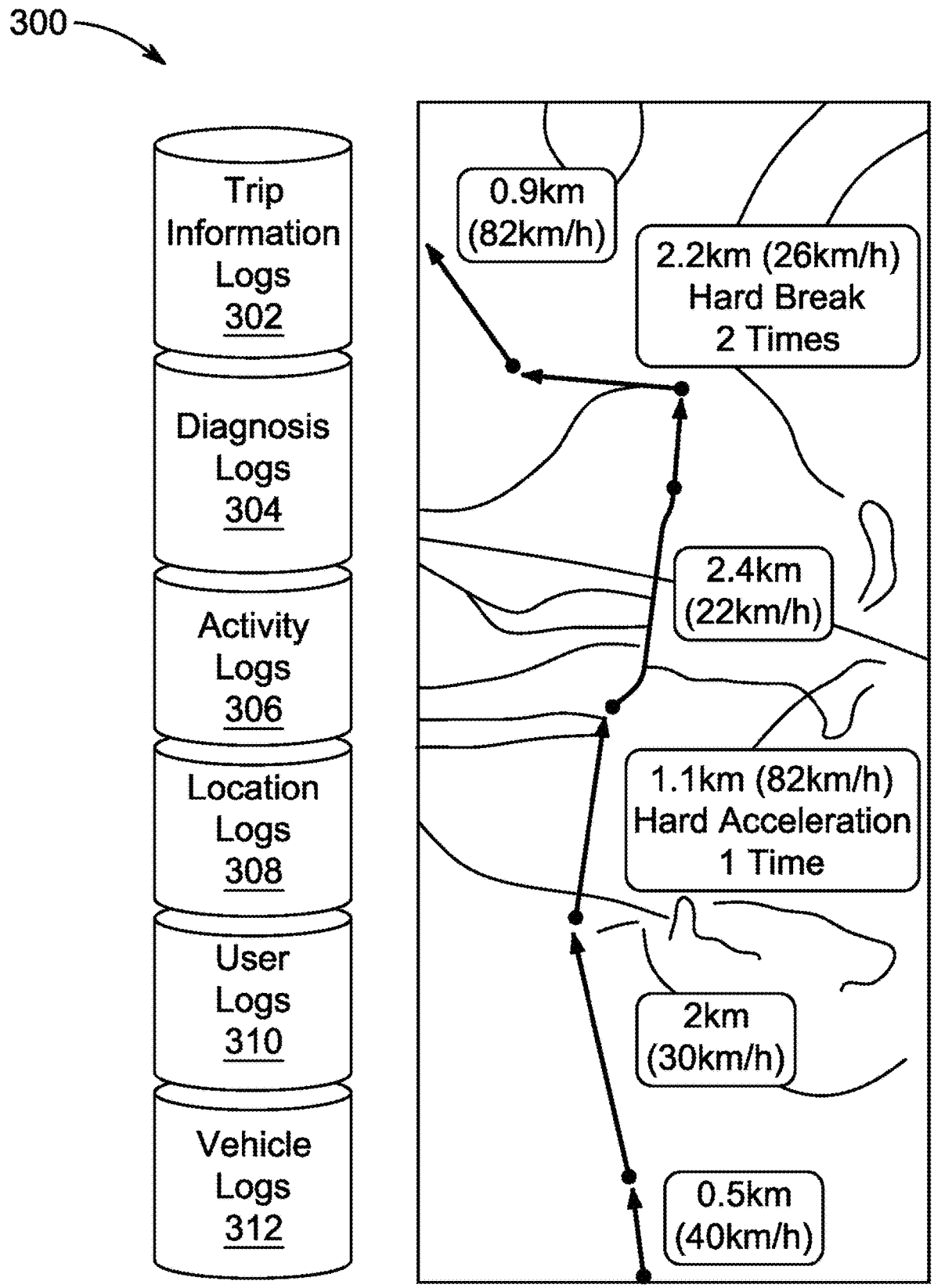
FIG. 3 is a block diagram schematically illustrating exemplary real-time automotive data captured by the system of FIG. 1, according to certain embodiments.

The mobile telematics devices 104 can e.g. be connected to the on-board diagnostic system 112 and/or an in-vehicle interactive device 114, wherein the mobile telematics devices 104 capture usage-based and/or user-based and/or operational telematics data of the motor vehicle and/or user. As illustrated in FIG. 3, the mobile telematics devices 104 capture usage-based and/or user-based and/or operational telematics data of the motor vehicle and/or user and transmit them via the data transmission network to the dynamic telematics circuit 102. The mobile telematics devices 104 are configured for capturing different kinds of telematics data 314, e.g., trips or trip segments 3141 and driving patterns 3142 from the motor vehicles and/or automation level data 3143 of the motor vehicle 10 (driving itself partially or fully autonomous (auto piloting)) and/or if the user is intervening with its automated or safety features. Such captured information may be stored in the form of logs data 300 (as shown in FIG. 3), including trip information logs 302, diagnosis logs 304, activity logs 306, location logs 308, user logs 310, and vehicle logs 312. The logs data can e.g. be stored in a persistence storage of the system 100 as structured log files, for example, as records capturing the measuring and/or operational data as events that occurring to the system 100 or messages between different devices/sensors of a communication within the system or the V2X-based traffic networking 2018. Thus, logging, as understood herein, is the act of keeping a log, in particular, keeping the measured parameters as an ordered time series of measuring parameter values. In one example, the logs 300 information and/or measuring data associated with a vehicle 10 and the occurring of events to the vehicle 10 respectively, such as measured location of the vehicle 10, a heading direction of the vehicle 10, speed 230 of the vehicle 10, distance traveled by the vehicle 10, measured fuel level of the vehicle 10, and so on. Further, the logs 300 may include operating parameters and/or environmental parameters during operation of the motor vehicle, including time-dependent speed measuring, hard braking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off road, G forces, brake pedal position, driver alertness, CAN (Controller Area Network) bus (vehicle's bus) parameters including fuel level, distance to other vehicles, distance to obstacles, driver alertness, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood.

In the present system 100, the mobile telematics devices 104 can be associated with a plurality of cellular mobile devices (as represented by reference numeral 120). Herein, the mobile telematics device 104 may be at least partially realized as part of cellular mobile device 120. The cellular mobile devices 120 may also include one or more data transmission connections to the vehicle-based telematics sensors 108, the sensors and/or measuring devices 110, the on-board diagnostic system 112 and/or in-vehicle interactive device 114 of the motor vehicle. As may be appreciated, modern cellular mobile devices 120, like smartphones (with the two terms being interchangeably used), are more than calling devices and incorporate a number of high-end sensors. With this, the use of smartphones 120 may be extended from the usual telecommunication field to applications in other specialized fields including transportation. Sensors embedded in the smartphones 120 like GPS 1181, accelerometer 1183/1185, and gyroscope 1184 may collect data passively, which in turn may be processed to infer the travel mode of the user. Because of GPS sensors 1181 being embedded into almost all modern smartphones 120, it becomes possible to replace the GPS data loggers being used previously, which are generally considered a burden to carry around. The smartphones 120 have an added advantage of being a necessary travel companion, hence being able to monitor the travel patterns over extended periods of time. In addition, GPS enabled smartphones 120 are also utilized for indoor positioning and pedestrian navigation. Further, the inclusion of an accelerometer in the smartphones 120 has dramatically enhanced its capability to accurately detect the travel mode and trip purpose. The accelerometer may detect accelerations along three axes (x, y, and z) with respect to the gravitational force. It means that at rest, the accelerometer will register an acceleration of 9.8 m/s2 along the downward direction. Orientation augments the accelerometer data by providing information regarding angular motion. Orientation sensors are often software-based and drive their data from the accelerometer and the geomagnetic field sensor. Parameters including data frequency, moving temporal window size, and proportion of data to be captured are dealt with to achieve better results. For the purposes of the present disclosure, the mobile telematics devices 104 may perform trip and trip segments detection as well as travel mode detection using the continuous flow of sensory data from the GPS sensor, the accelerometer, and orientation sensor collected by the smartphones 120.

GPS measuring points of the sets of motion status signals can e.g. be at least partially enriched by measured additional sensory data measured by further sensors of the mobile telematics device 104 and/or by sensory data measured by the vehicle-based telematics sensors 108 at any stage before transferring the sets of motion status signals to the dynamic telematics circuit 102. As discussed, the sensors and measuring devices 110 of the mobile telematics device 104 or the smartphone 120 may at include an accelerometer sensor or measuring device and a gyroscope sensor or measuring device and a GPS sensor or measuring device. In an example, for the sensing phase, the frequencies for which the sensors may be logged are, for example, 1 Hz for the GPS sensors and 50 Hz for accelerometers and gyroscopes. Each measure of location data is captured in association with a time stamp. Thus, for trips and/or trip-segments identification, each measurement of the instantaneous movement telematics data is captured and assigned to a measured time stamp by means of a polling device, wherein the measurements of the telematics data are provided in an interval sensing within a defined time interval between two sensing steps. Before analyzing the data, the captured data need to be brought into a format that may be understood by the ad-hoc classifier module. The measurements stream may be chunked into windows of 1 second. Since acceleration data is expected to be sampled at 50 Hz, each window will consist of approximately 50 acceleration measurements with 3 (three) dimensions and a timestamp each and approximately one GPS coordinate pair together with a timestamp. This is due to the fact that the actual sampling is implementation-dependent and only accessible on the hardware level. Each chunk is then treated individually as soon as it may be computed. After getting the needed format, as described above, the most likely components may be approximated by turning the acceleration axes of the mobile device 120 into the axes of the actual movement, thus getting a more thoroughly rotated system of reference. The input of the operation consists of the acceleration vector-only and may return rotated acceleration vectors of the same format.

Telematics data are aggregated by means of the dynamic telematics circuit 102 from the mobile telematics devices 104 associated with a plurality of motor vehicles 10. For this purpose, as illustrated, the dynamic telematics circuit 102 includes a vehicle-telematics driven aggregator 122. The present vehicle-telematics driven aggregator 122 can e.g. be adapted to cope with the physical limits of the cellular mobile devices 120 in order to minimize both the information loss (potential car-relevant data) and the battery consumption. The vehicle-telematics driven aggregator 122 may provide the technical structure to allow implementation of appropriate logging strategies with defined measure and/or metric and/or KPI metrics. A measure herein is a defined technical and physically measurable quantification or indexing. A metric herein is a measure as a fundamental or unit-specific term but is beyond that directed performance directed measures. KPIs (Key Performance Indicator) are relevant measurable performance metrics that are measurable to the operation of devices or the same. Typically, KPIs are determined measuring over a specified time period, and compared against acceptable norms, past performance metrics or target measurement. For the risk measurement and risk scoring measurement, the dynamic telematics circuit 102 may configure the vehicle-telematics driven aggregator 122 with telematics data-based triggers, triggering, capturing, and monitoring in the dataflow pathway of the vehicle-based telematics sensors 108, the sensors and/or measuring devices 110, the on-board diagnostic system 112 and/or the in-vehicle interactive device 114 of the motor vehicle, including sensory data of the sensors of the mobile telematics device 104 and/or operating parameters and/or environmental parameters during operation of the motor vehicle.

The vehicle-telematics driven aggregator 122 for the mobile telematics devices 104 can e.g. provide instantaneous movement telematics data as measured by and logged from sensors 118/108/110 of the mobile telematics devices 104 and trips and/or trip-segments based on the instantaneous movement sensory telematics data as automatically identified and detected. This is possible as the telematics data include usage-based and/or user-based and/or operation-based sensory data, and at least include sensory data form the accelerometer sensor, the gyroscope sensor, and the GPS sensor, assigned with respective time stamps. The access to the sensors may be made available in different ways depending on the operating system. For example, for Android-based mobile smartphone devices, Android allows the implementation of listeners over the sensors. As another example, for iOS-based mobile smartphone devices, iOS of Apple allows the logging of the sensors only when a significant change in the GPS position is observed. It is to be noted that per se the operation to monitor such condition doesn't drain battery amperage in the iOS because the device stores GPS position via physical motion co-processor. Android doesn't provide an API (Application Programming Interface) to interact with motion co-processor of the device (thus different chips might work in a different way). Under APIs, typically a set of commands is provided that may be used to access specific functionality of the underlying operating system (OS) or hardware device. For example, in this case, the cellular mobile devices 120 might have a specific API that allows interacting with the motion co-processor of the device, or not. This drawback sometimes may be overcome. For example, a significant position change mechanism might be implemented via software in Android, however, the switch-on operation of the GPS chip drains a lot of the battery. It is to be noted further that GPS's battery draining behavior is most noticeable during the initial acquisition of the satellite's navigation message: the satellite's state, ephemeris, and almanac. Acquiring each satellite takes 12 to 30 seconds. It is to be noted that, for feature extraction, it may be preferable to add additional information with regards to the features to be extracted, wherever necessary. For example, the fast discrete Fourier Transform (FFT) is an efficient way to obtain the frequency modes of the time windows. Since most implementations opt for the most efficient algorithm that always treats time series in powers of two (i.e., sequences of length 2, 4, 8, 16 . . . ), the time series have to be analyzed on the base of 64 measurement points: For a window size of 1 second and a sampling frequency of 50 Hz, 50 samples of acceleration values are obtained. This sequence is to be filled with zeros such that the input of the FFT consists of the necessary 64 (sixty-four) numbers, in order to avoid variations in actual numerical scope.

Further, as discussed, the dynamic telematics circuit 102 can e.g. comprise a driving score module 124. The driving score module 124 is configured for measuring and/or generating a single or a compound set of variable scoring parameters profiling the use and/or style and/or environmental condition of driving during operation of the motor vehicle based upon the triggered, captured, and monitored sensory data of the sensors of the mobile telematics device 104 and/or operating parameters or environmental parameters. The single or compound set of variable scoring parameters, as generated by the driving score module 124, may include scoring parameters 1241 measuring a driving score 12411 and/or a contextual score 12412 and/or a vehicle safety score 12413. For the driving score measure 12411, the contextual score measure 124112 and the vehicle safety score measure 12413, the measured variable driving scoring measuring parameter 12411 is at least based upon a measure of driver behavior parameters comprising the identified maneuvers and/or speed and/or acceleration and/or braking and/or cornering and/or jerking, and/or a measure of distraction parameters comprising mobile phone usage while driving and/or a measure of fatigue parameters and/or drug use parameters; the measured variable contextual scoring parameter 12412 is at least based upon measured trip score parameters based on road type and/or number of intersection and/or tunnels and/or elevation, and/or measured time of travel parameters, and/or measured weather parameters and/or measured location parameters, and/or measured distance driven parameters; and the measured variable vehicle safety scoring parameter 12413 is at least based upon measured ADAS feature activation parameters and/or measured vehicle crash test rating parameters and/or measured level of automation parameters of the motor vehicle and/or measured software risk scores parameters. Measuring at least the trips and/or trip segments, the scoring measurement may be improved by further contributors, which may include contributors such as, distracted driving, speeding, drunk driving, reckless driving, rain, running red lights, running stop signs, teenage drivers, night driving, car design effects, and the like.

The driving score module 124 automatically generates said single or set compound of variable scoring parameters. Exemplary scores' measuring parameters could be as follows: e.g., driving score such as trips and/or trip segments and/or driving maneuvers and/or speed, acceleration, jerking, distraction, fatigue, traffic lights, distance (following too close), etc. and a contextual score such as weather, road types, road signs, etc. and vehicle safety score such as activated/usage of automated features, etc. This automated scoring feature makes it possible to link all main contributors of accidents to risk-relevant data points and risk drivers for scoring and risk measuring/assessment technical objects. By means of the CAN-BUS or TCU (Telematics control unit) data of the vehicle, the scoring and risk measurement/assessment may be achieved more accurately and in a more precise manner for end consumers leading to an improved and optimized client centric experience and risk selection. Thereby, the present system 100 scores individual drivers at least based on the measured, detected, and recognized trips and/or trip segments, respectively, on the monitored sensory data of the sensors of the mobile telematics device 104 and/or operating parameters or environmental parameters. Based on the score and/or other relevant telematics data visible to consumers and the risk-transfer provider (insurers) (if the consumer agrees), the present system 100 is able to provide measures of risk-transfer claims frequency and severity in consideration of the impact of ADAS features, as discussed in the proceeding paragraphs in more detail.

Figure 9:
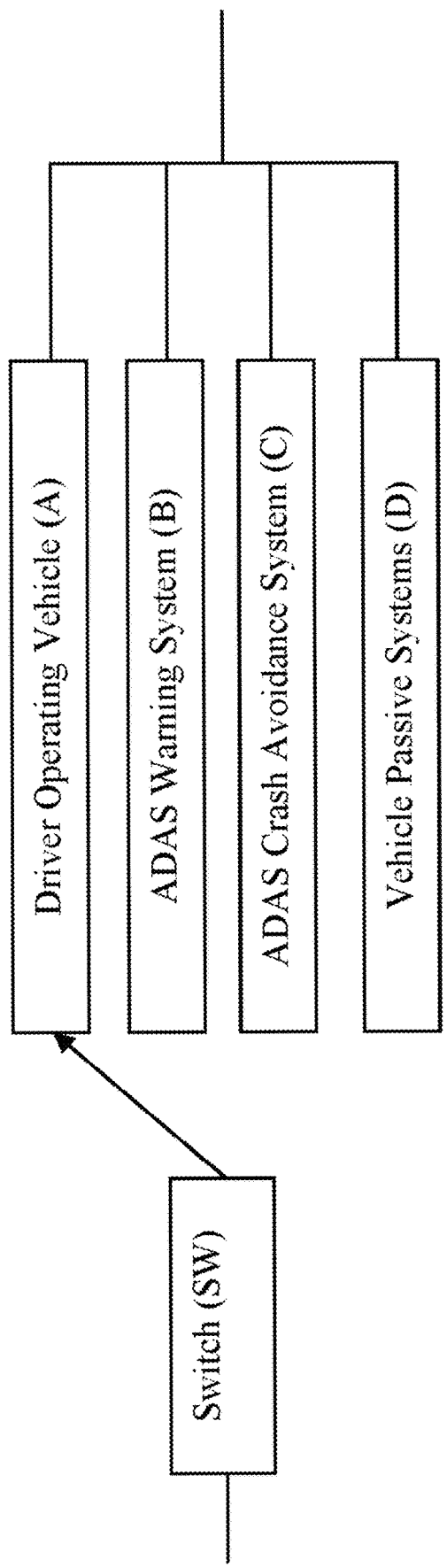
FIG. 9 is a block diagram schematically illustrating an exemplary structure 1 enabling to capture and parameterize the nature and sequence of interactions between the driver as vehicle operator, ADAS warning, ADAS crash avoidance system and vehicle passive systems.

The system 100 can e.g. further comprise an automotive measuring system of occurring forward-looking accident frequencies and severities and/or risk-measuring system 130. The automotive risk-measuring system 130 is configured to process the telematics data 1043 to generate an ADAS risk score measure 1301. For forward-looking measuring and forecast of localized accident frequencies in dependence of the chosen time-window and driver condition, the impact of both active and passive safety systems, if activated, must be captured/measured. An exemplary nature and sequence of interactions between the driver as vehicle operator, ADAS warning, ADAS crash avoidance system and vehicle passive systems can e.g. be shown by the exemplary block diagram as shown in FIG. 9 (structure 1). The exemplary parametrization shown is technically able to capture a specific technical vehicle design. If the driver fails to operate the vehicle safely, the ADAS warning system gives necessary alarms to driver, the failure in ADAS warning leads to activation of ADAS Crash avoidance system and finally the failure in ADAS crash avoidance system results in activation of vehicle passive system (PSS). Structure 1 can be taken as a basic level of the structures 2-4 which are presented by FIGS. 10-12. The risk of accidents depends on the principle of design (e.g., modules in parallel). The risk impact of such system composed of Driver, Active (ADAS Warning and ADAS Crash Avoidance Systems) and Passive safety systems as illustrated in FIG. 9 can e.g. be parameterized at any given time based on the relation 1.

$$R_{system\ of\ Model\ 1} = R_{switch-A\ to\ B} \cdot R_A(t) + \int_0^t f_A(x_A) \cdot R_{switch-A\ to\ B} \cdot R_B(t-x_A) \cdot dx_A + \int_0^t f_A(x_A) \cdot \int_{x_A}^t f_B(x_B) \cdot R_{switch-B\ to\ C} \cdot R_C(t-x_A-x_B) \cdot dx_B \cdot dx_A + \int_0^t f_A(x_A) \cdot f_B(x_B) \cdot \int_{x_B}^t f_C(x_C) \cdot R_{switch-C\ to\ D} \cdot R_D(t-x_A-x_B-x_C) \cdot dx_A \cdot dx_B \cdot dx_C$$

Notations Used:

$R_{system}$ = System Reliability $R_{switch-A\ to\ B}$ = Reliability of Switching Mechanism from System A to System B $R_{switch-B\ to\ C}$ = Reliability of Switching Mechanism from System B to System C $R_{switch-C\ to\ D}$ = Reliability of Switching Mechanism from System C to System D $R_A(t)$ = Reliability of Driver Operating the Vehicle at time t (A)

$R_B(t)$ = Reliability of ADAS Warning System at time t (B)

$R_C(t)$ = Reliability of ADAS Crash Avoidance System at time t (C)

$R_D(t)$ = Reliability of Vehicle Passive System at time t (D)

$f_A(x_A)$ = Probability Density Function of Driver Failure (A)

$f_B(x_B)$ = Probability Density Function of ADAS Warning System Failure (B)

$f_C(x_C)$ = Probability Density Function of ADAS Crash Avoidance System (C)

$x_{A\ or\ B\ or\ C\ or\ D}$ = Time of failure of component A or B or C or D

It is to be noted that the process for providing inventive structure 1 and its parametrization remains the same for each potential stream of failures leading to an accident. It means that each type of human failure may trigger a certain type of ADAS warning, subsequently failure in that triggered ADAS warning is going to activate a certain ADAS crash avoidance system, and finally the failure in that activated ADAS crash avoidance system will lead to the activation of a particular passive safety system. Furthermore, the human component in structure 1 can be divided into mental and physical components in series in which the failure in each can result in failure of the driver. Further, the ADAS warning and ADAS crash avoidance components in structure 1 can be decomposed to sub-systems in a series structure. With respect to Vehicle Passive Safety System in structure 1, this type of system in vehicles may contain several components in series that are all triggered by an incident in order to protect passengers (i.e., activation of air bag and advanced seatbelts). Thus, structure 1 as illustrated in FIG. 9 can be transformed into a more micro level in form of a stand-by parallel series structure as depicted in FIG. 10 (structure 2).

Figure 10:
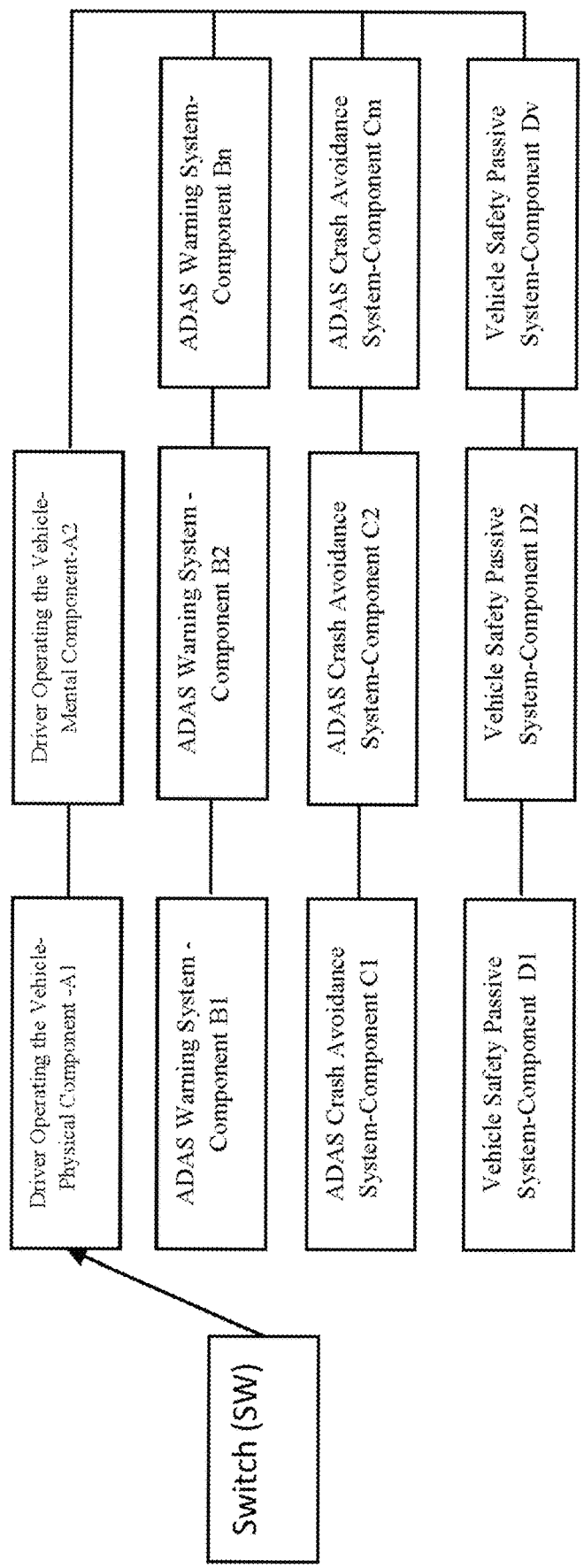
FIG. 10 is a block diagram schematically illustrating an exemplary RBD of Stand-by System Composed of Multi-Components of Driver (Series), ADAS Warning Systems (Series), ADAS Crash Avoidance Systems (Series) & Passive Systems (Series) (structure 2).

FIG. 10 shows RBD of Stand-by System Composed of Multi-Components of Driver (Series), ADAS Warning Systems (Series), ADAS Crash Avoidance Systems (Series) & Passive Systems (Series) (structure 2). Accordingly, the forward-looking simulation of structure 2 can e.g. be parameterized by the following relation 2.

$$R_{system\ of\ Model\ 2} = R_{switch-A\ to\ B} \cdot R_{A1}(t) \cdot R_{A2}(t) +$$

$$\sum_{f=1}^{2}\left(\int_0^t f_{Ai}(x_{Ai}) \cdot R_{switch-A\ to\ B} \cdot \left(\prod_{j=1}^{n} R_{Bj}(t - x_{Ai})\right) dx_{Ai}\right) +$$

$$\sum_{i=1}^{2}\left(\sum_{j=2}^{n} \int_0^2 f_{Ai}(x_{Ai}) \cdot \right.$$

$$\left. \int_{x_{Ai}}^2 f_{Bj}(x_{Bj}) \cdot R_{switch-B\ to\ C} \cdot \left(\prod_{k=2}^{m} R_{Ck}(t - x_{Ai} - x_{Bi})\right)\right) \cdot dx_{Bj} \cdot dx_{Ai} +$$

-continued $$\sum_{i=1}^{2}\left(\sum_{j=1}^{n}\left(\sum_{k=1}^{m} \int_0^t f_{Ai}(x_{Ai}) \cdot \int_{x_{Ai}}^t f_{Bj}(x_{Bj}) \cdot \int_{x_{Bj}}^t f_{Ck}(x_{Ck}) \cdot \right.\right.$$

$$\left.\left. R_{switch-C\ to\ D} \cdot \prod_{l=1}^{v} R_{Dl}(t - x_{Ai} - x_{Bj} - x_{ck})\right)\right) dx_{Ai} \cdot dx_{Bj} \cdot dx_{Ck}$$

Figure 11:
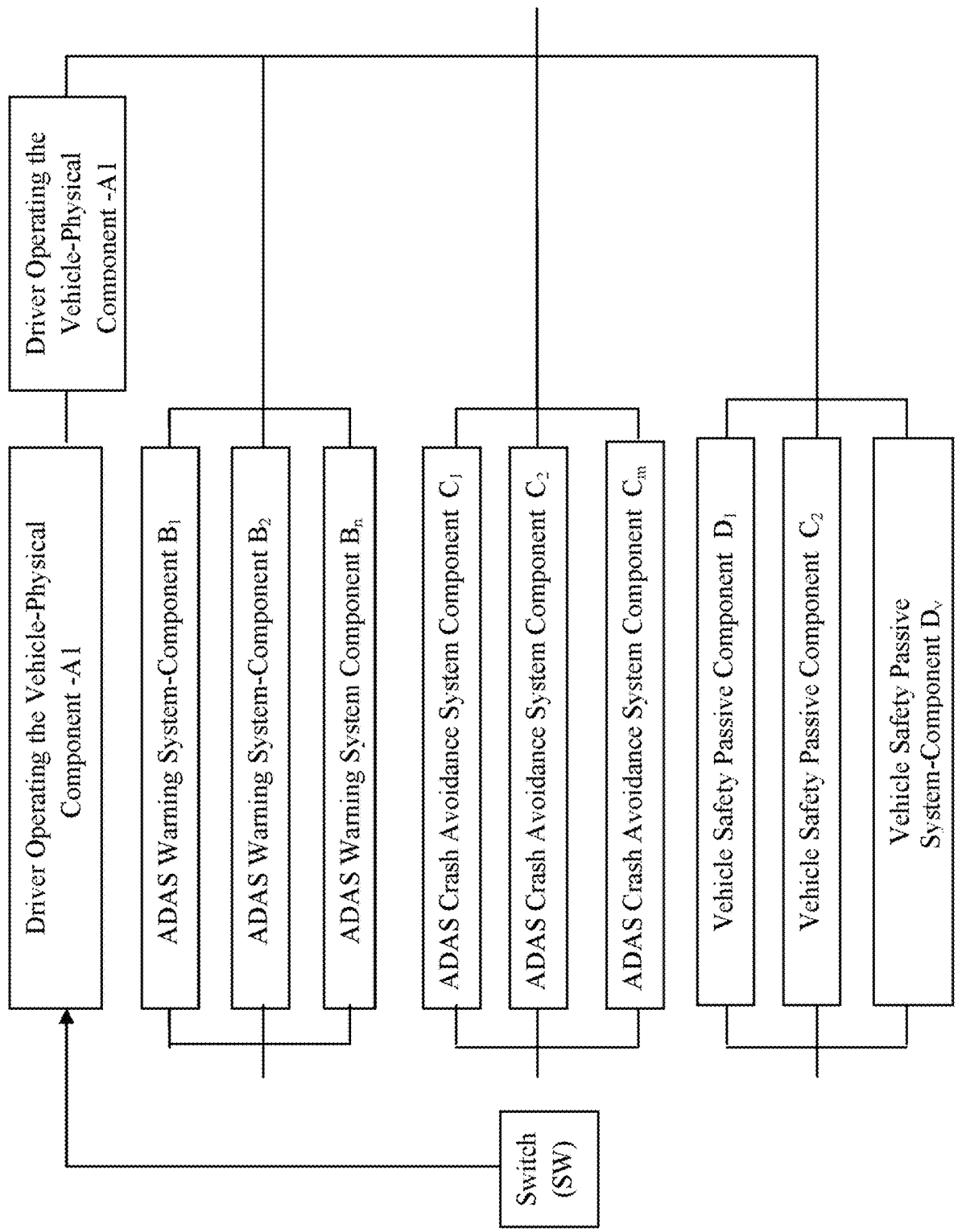
FIG. 11 is a block diagram schematically illustrating exemplary another potential design of a vehicle consisting of a driver, ADAS systems, and PSS can be consistent with the reliability block diagram of structure 3.

As FIG. 11 illustrates, the other potential design of a vehicle consisting of a driver, ADAS systems, and PSS can be consistent with the reliability block diagram of structure 3. In this structure, the physical and mental components of a human as a driver remain in a series but the other systems including ADAS Warning, ADAS Crash Avoidance and Passive Systems would be broken down to components in a parallel structure. The risk impact factor of such system as illustrated in FIG. 11 (structure 3) can be parametrized by the following relation 3.

$$R_{system\ of\ Model\ 3} = R_{switch-A\ to\ B} \cdot R_{A1}(t) \cdot R_{A2}(t) +$$

$$\sum_{i=1}^{2}\left(\left(\int_0^t f_{Ai}(x_{Ai}) \cdot R_{switch-A\ to\ B} \cdot \left(1 - \prod_{j=1}^{n}(1 - R_{Bj}(t - x_{Ai})) dx_{Ai}\right)\right)\right) +$$

$$\sum_{i=1}^{2}\left(\int_0^t f_{Ai}(x_{Ai}) \cdot \int_{x_{Ai}}^t \left(\prod_{j=1}^{n} f_{Bj}(x_{Bj})\right) \cdot \right.$$

$$R_{switch-B\ to\ C} \cdot \left(1 - \prod_{k=1}^{m}(1 - R_{Ck}(t - x_{Ai} - x_{Bj}))\right) \cdot dx_{Bj} \cdot dx_{Ai} +$$

$$\sum_{i=1}^{2}\left(\int_0^t f_{Ai}(x_{Ai}) \cdot \int_{x_{Ai}}^t \left(\prod_{j=1}^{n} f_{Bj}(x_{Bj})\right) \cdot \int_{x_{Bj}}^t \left(\prod_{k=1}^{m} f_{Ck}(x_{Ck})\right) \cdot \right.$$

$$R_{switch-C\ to\ D} \cdot \left(1 - \prod_{l=1}^{v}(1 - R_{Dl}(t - x_{Ai} - x_{Bj} - x_{ck}))\right) dx_{Ai} \cdot dx_{Bj} \cdot dx_{Ck}$$

Figure 12:
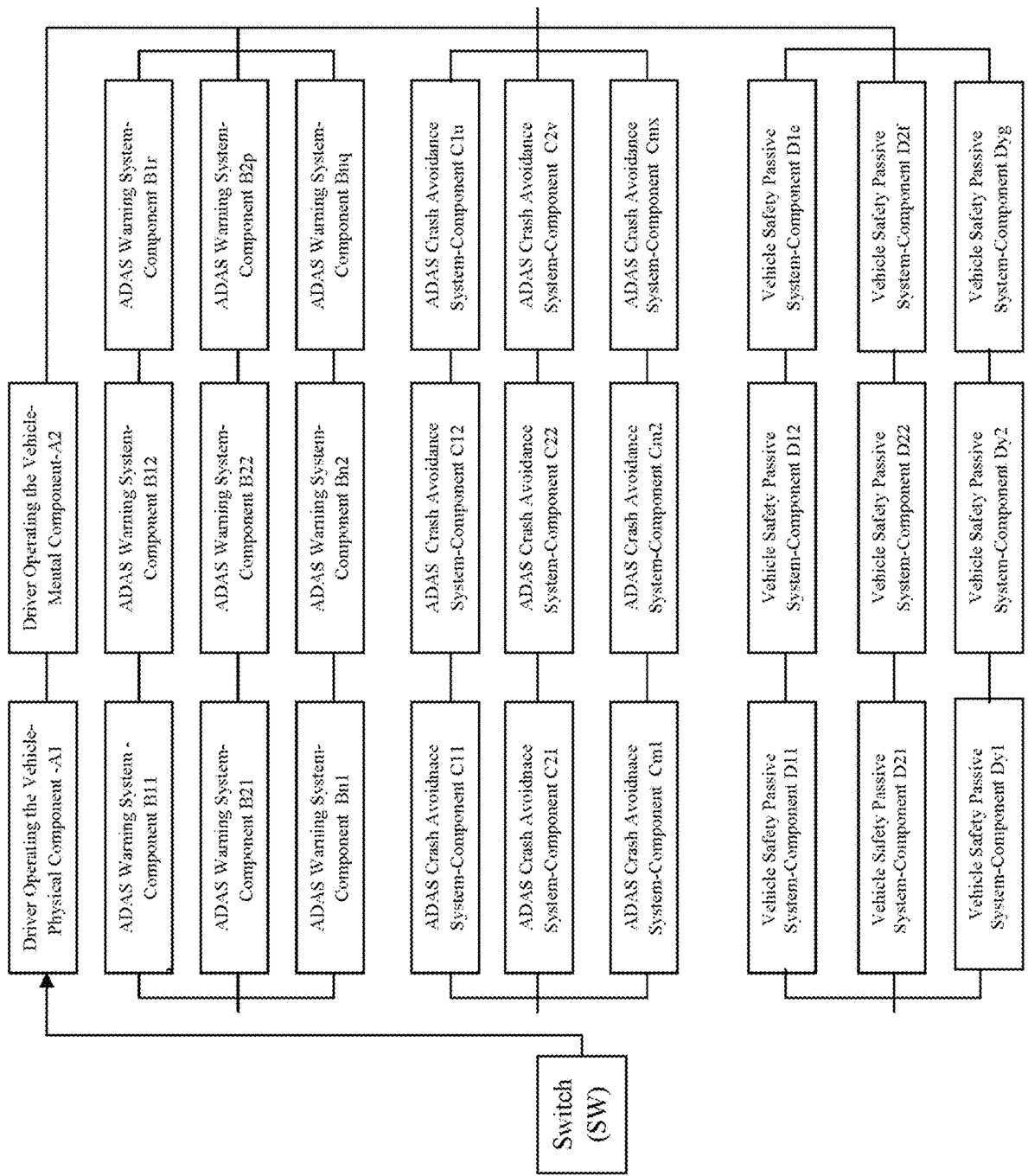
FIG. 12 is a block diagram schematically illustrating an exemplary RBD of Stand-by System Composed of Multi-Components of Driver (Series), ADAS Warning Systems (Parallel-Series), ADAS Crash Avoidance Systems (Parallel-Series) & Passive Systems (Parallel-Series) (structure 4).

FIG. 11 shows RBD of Stand-by System Composed of Multi-Components of Driver (Series), ADAS Warning Systems (Parallel), ADAS Crash Avoidance Systems (Parallel) & Passive Systems (Parallel) (structure 3). A further expansion of the structures 1 to 3 may lead to a more complex structure as illustrated in FIG. 12. In this structure the human elements remains in series, whereas the constituting components of each of ADAS Warning, ADAS Crash Avoidance and PSS modules are designed in parallel-series (4)

$$R_{system\ of\ Model\ 4} = R_{switch-A\ to\ B} \cdot R_{A1}(t) \cdot R_{A2}(t) + \sum_{i=1}^{2}$$

$$\left(\left(\int_0^t f_{Ai}(x_{Ai}) \cdot R_{switch-A\ to\ B} \cdot \left(1 - \prod_{j=1}^{n}\left(1 - \prod_{p=1}^{\Gamma,\forall j=1;p,\forall j=2;...;q,\forall j=n} R_{Bip}(t - x_{Ai})\right)\right) dx_{Ai}\right)\right) +$$

$$\sum_{i=1}^{2}\left(\int_0^t f_{Ai}(x_{Ai}) \cdot \int_{x_{Ai}}^t \left(\prod_{j=1}^{n}\left(\sum_{p=1}^{r,\forall j\neq p;p,\forall j\neq 2;...;q,\forall j=m} f_{Bjp}(x_{Bjp})\right)\right) \cdot R_{switch-B\ to\ C} \cdot \right.$$

$$\left(1 - \prod_{k=1}^{m}\left(1 - \left(\prod_{d=1}^{n,\forall j=2;...;x,\forall j=n} R_{Ckd}(t - x_{Ai} - x_{Bj})\right)\right)\right) \cdot dx_{Bj} \cdot dx_{Ai} + \sum_{k=1}^{2}\left(\int_0^t f_{Ai}(x_{Ai}) \cdot \right.$$

$$\int_{x_{Ai}}^t \left(\prod_{j=1}^{n}\left(\sum_{p=1}^{r,\forall j=1;p,\forall j=2;...;q,\forall j=m} f_{Bjp}(x_{Bjp})\right)\right) \cdot \int_{x_{Bi}}^t \left(\prod_{k=1}^{m}\left(\sum_{d=1}^{u_s=1;v,\forall j=2;...;x,\forall j=n} f_{Ckd}(x_{Ckd})\right)\right) \cdot$$

$$R_{switch-C\ to\ D} \cdot \left(1 - \prod_{l=1}^{y}\left(1 - \prod_{p=1}^{e,\forall j=1;f,\forall j=2;...;q,\forall j=m} R_{Dlp}(t - x_{Ai} - x_{Bj} - x_{Ck})\right)\right) dx_{Ai} \cdot dx_{Bj} \cdot dx_{Ck}$$

structure as presented in structure 4. The modules themselves are here designed in parallel in relation to each other in order to achieve greatest possible reliability in system. The impact on the risk of structure 4 as illustrated in FIG. 12 can e.g. be parametrized and simulated by the relation 4.

Figure 13:
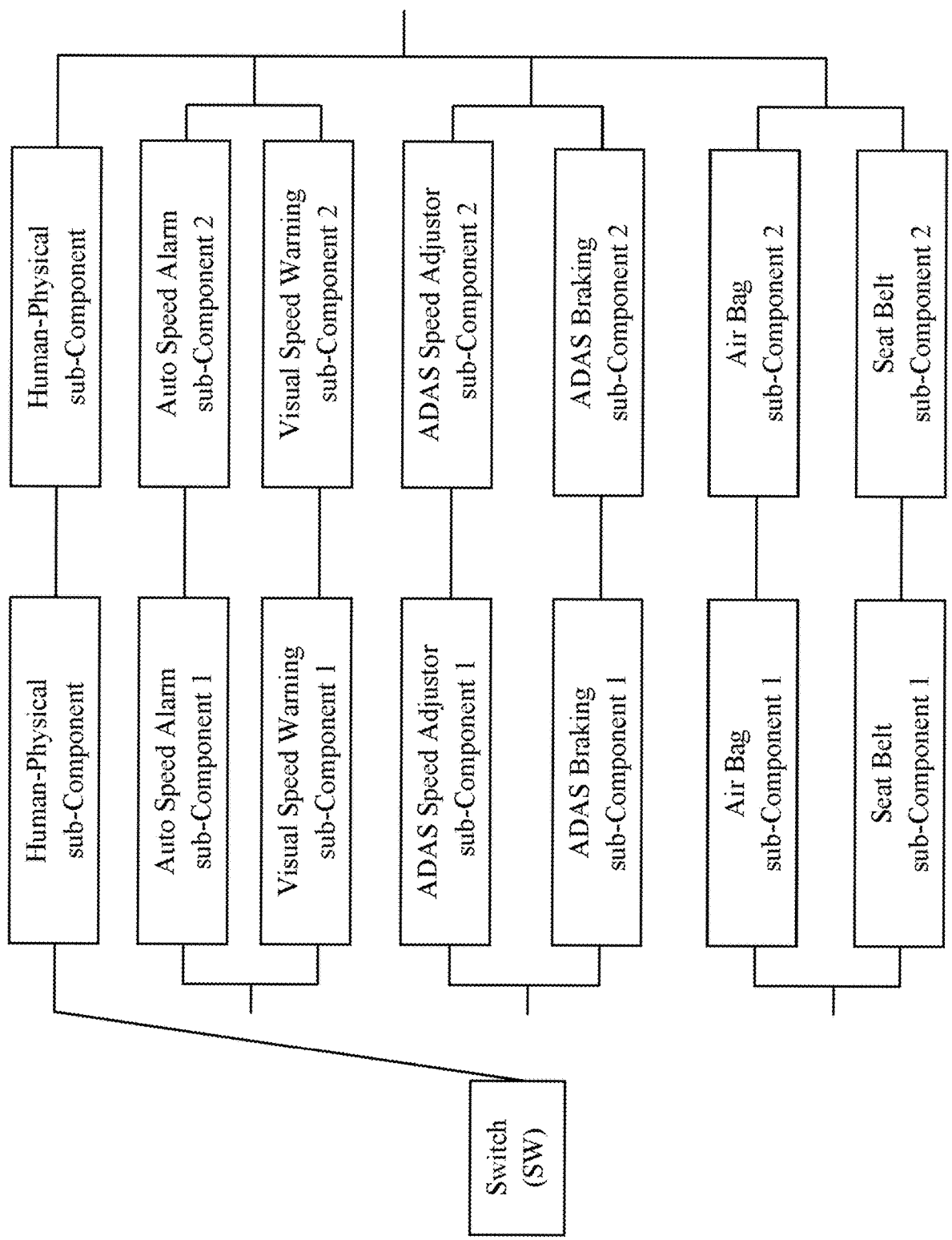
FIG. 13 is a block diagram schematically illustrating an exemplary real example of structure 4 as the complex parametrization and simulation structure to capture the contribution of the various safety means activated in a car and extract them from the measured telematics measuring parameters.

FIG. 12 illustrated RBD of Stand-by System Composed of Multi-Components of Driver (Series), ADAS Warning Systems (Parallel-Series), ADAS Crash Avoidance Systems (Parallel-Series) & Passive Systems (Parallel-Series) (structure 4). FIG. 13 shows a real example of structure 4 as the complex parametrization and simulation structure to capture the contribution of the various safety means activated in a car and extract them from the measured telematics measuring parameters. Therefore, a simple example of the application of structure 4 as a complex form of the structures according to the invention, though the foundation of all four structures are alike, is presented in FIG. 13. In this example, the human fails to control the speed within safe limit due to mental or physical failure, as the result the visual and audio warnings are presented to the driver. The failure in effectively controlling the speed with these warnings cause the activation of ADAS speed adjustor and braking systems. Finally, failures in the ADAS activation systems will result in activation of seatbelt and airbag systems as the last resort to protect the human casualties.

It is to be noted that as the reliability of systems in a series structure is typically lower than that of a parallel structure when the number of components remains the same, thus the structures (i.e., structure 1-4) can also be realized in parallel in relation to each other in order to enhance the safety of a system and reduce the measured risk. As the result, the total reliability of a vehicle composed of a number of structures each similar to either of structures 1-4 can be simulated and forward-looking modeled by the following relation 5:

$$R_{Total} = 1 - \prod_{i=1}^{n}(1 - R_{System\,of\,Model\,i})$$

Again, it is to be noted that dedicated measurements of the contribution of the different safety features to the reduction or increase of the measured risk values is typically complex. The human as driver is a person in the control of a vehicle until the moment of crash but it has to be understood that the human is under continued impact by various factors including road conditions and environment, vehicle and human's state, abilities and conduct. The technical designs of vehicles and roads have been intended to provide drivers with extra comfort with less physical and mental efforts, whereas the fatigue imposed on driver is often just being transformed from overload fatigue to under-load fatigue and boredom. Studies indicate that human as a driver of transportation systems are prone at any given time with a varying risk to inevitable errors leading to accidents and casualties. Such complex relations makes dedicated measurements technically complex. The system may comprise a database having factors detailing the different types of errors and their causal factors in road transportations. An appropriate error database can be used for the identification of different errors and causes in road transportation accidents and the development of error counter measures. The potential error countering measures can be focused on such categories as driver error reduction (e.g., improved ergonomically designed vehicles, improved road environment design, training), the use of ADAS technologies to prevent or minimize risk of accidents in the event of driver's error and finally the passive systems (e.g., seatbelts, airbags) in the event of failure in ADAS and driver's error/failure. The present invention allows to differentiately measure how these three groups of error counter measures interact in a vehicle system in terms of impact and reliability of their individual and overall functions and how the failures in any combination of the constituting components of these three groups of counter measure systems affect the reliability of total system in light of occurrence of accidents. The prediction respectively forecast of vehicles equipped with ADAS and passive systems obtained based on measurements of telematics data in loco at any given time by the structures 1 to 4 varying in the degree of complexity. The present inventive system can be used for measuring the reliability of system or forecast of accident occurrence probabilities preferably in conceptual stage of vehicle design by auto industries, road transportation authorities and the technical skilled persons. With the inventive systematic measurement regarding accidents involving vehicles equipped with ADAS and Passive Systems and feeding the measurements to such forecast and simulation structures and into the design and processes of vehicles development, the casualties resulting from road accidents shall be expected to decline constantly in the future. Finally, the predictive measuring and optimization modeling of the risk reduction impact of the road transportation containing interacting multi vehicles (different in degree, type, and complexity of use of ADAS and PSS technologies), pedestrians, road infrastructures, drivers with varying skills, etc. is another technical advantage of the present invention.

Herein, the ADAS risk score measure 1301 indicates an impact of ADAS features 200 to an accident risk associated with the motor vehicle 10, i.e. the measured forward-looking, location-dependent and time-dependent occurrence frequency and severity of accident events, e.g. provided by a forward-looking simulation approach based on the measured actual telematics data 1043. ADAS risk score measure 1301 relates to measuring systems in the field of autonomous vehicle driving, in particular, to risk assessment in the field of autonomous vehicle driving or ADAS systems. ADAS risk score is a risk-transfer rating factor, calibrated on a specific portfolio of a client, capturing the impact of ADAS in terms of measured insurance claims frequency and severity. The ADAS risk score measure may inter alia be used for: (1) Portfolio Profitability Analysis and (2) Underwriting Factor. In the Portfolio Profitability Analysis, the score allows providing insights into the client's exposure to ADAS (descriptive analytics) as well as a set of advanced portfolio analyses highlighting the enhanced predictive power of a motor risk model. The present system 100 allows providing potential impacts based on the ADAS risk score on the client's insurance tariff and pricing strategy. In the Underwriting Factor, the ADAS risk score may be provided at the point of quote. Through the present system 100, the ADAS risk score may be provided globally, at the vehicle level, and easily accessible in near real-time. No raw vehicle specifications are provided through the ADAS risk score. Instead, the ADAS risk score provides a single score measure, i.e., the ADAS risk score, reflecting the impact of ADAS, as equipping a vehicle, on insurance claims frequency and severity. The system 100 may distinguish between covertypes (MOD/MTPL) when providing the ADAS risk score. The ADAS risk score, as provided by the system 100, bridges the gap and provides the insurance technology with the missing piece of information using technological and scientific methodology.

Further, the automotive risk-measuring system 130 is configured to calibrate a user-specific rated risk-transfer, wherein the user-specific rated risk-transfer defines an impact of ADAS features 200 in measures of risk-transfer claims frequency and severity. That is, the present system 100 performs calibration for a specific market or technological automobile segment, vehicle testing at a single sensor level, and simulations. This combination provides an unmatched resolution enabling evaluation and differentiating ADAS features 200 with respect to car manufacturers, car models, and technological evolutive steps. In turn, this leads to much more accurate pricing predictions and risk model structures for risk-transfer systems and closed-loop feedbacks to OEMs in terms of the real effectiveness of their systems in real traffic situations. This is possible from a technological and scientific interaction with car manufacturers where vehicles' build data are processed through the present system 100. For the risk-measuring by the automotive risk-measuring system 130, dynamically measured and detected tips and/or trip segments may, for example, be used to perform an output signal generation based upon detected tips and/or trip segments and/or further risk measure parameters and/or crash attitude measure parameters. The automotive risk-measuring system 130 is able to react in real-time, dynamically on captured motion and/or environmental measuring parameters, in particular on monitored and captured telematics parameters of the telematics devices 104 during motion or movement of the telematics devices 104. In addition, the measured risk score may be easily applied to risk modelling structures of other automotive risk-measuring system 130. Thus, the automotive risk-measuring system 130 enables to measure and assess ADAS effectiveness to accurately reflect the impact of ADAS on vehicle safety.

Figure 4:
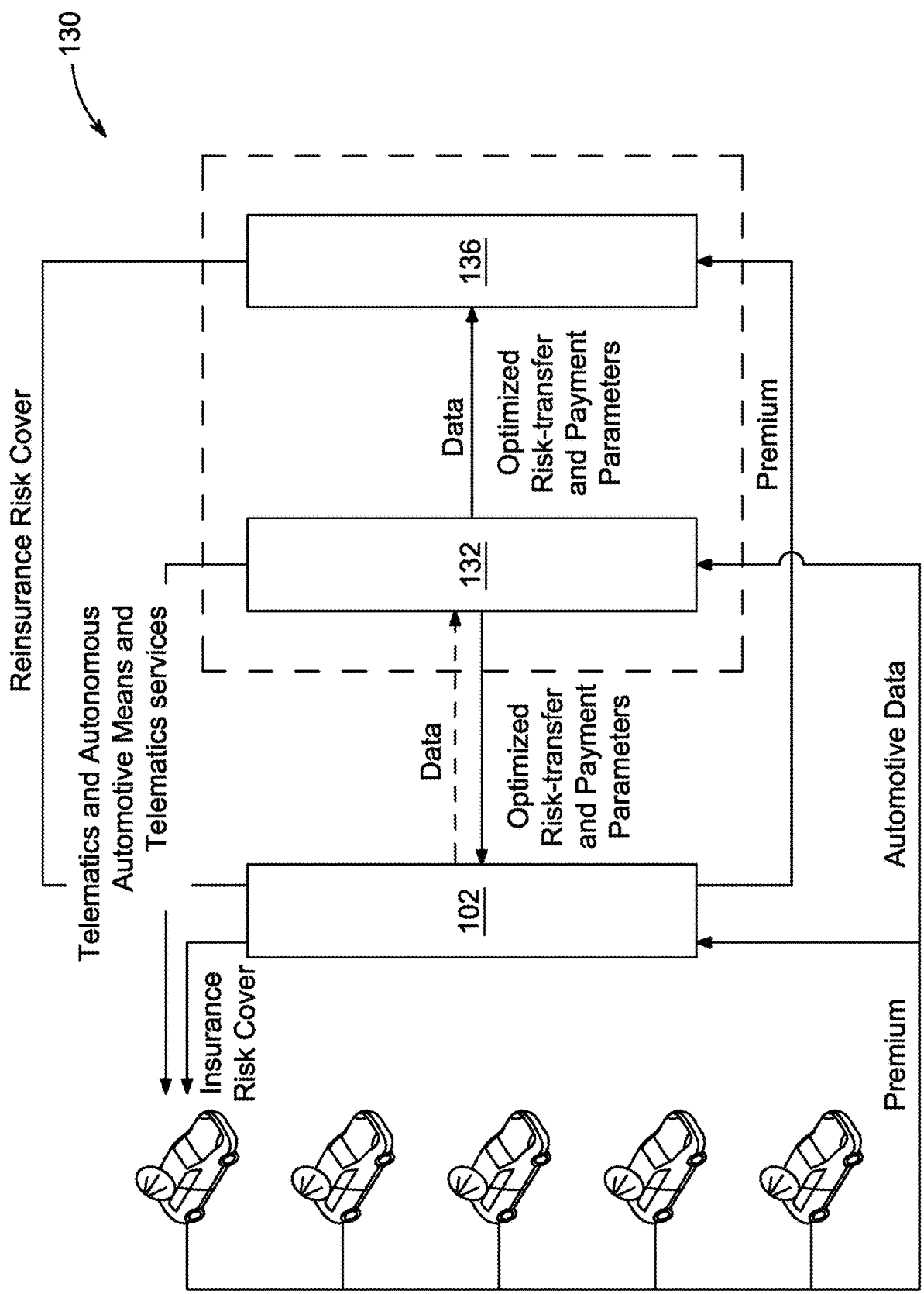
FIG. 4 is a block diagram schematically illustrating an exemplary automotive-based, dynamic triggered, multi-tier risk-transfer configuration provided by the system of FIG. 1, according to certain embodiments.
Figure 5:
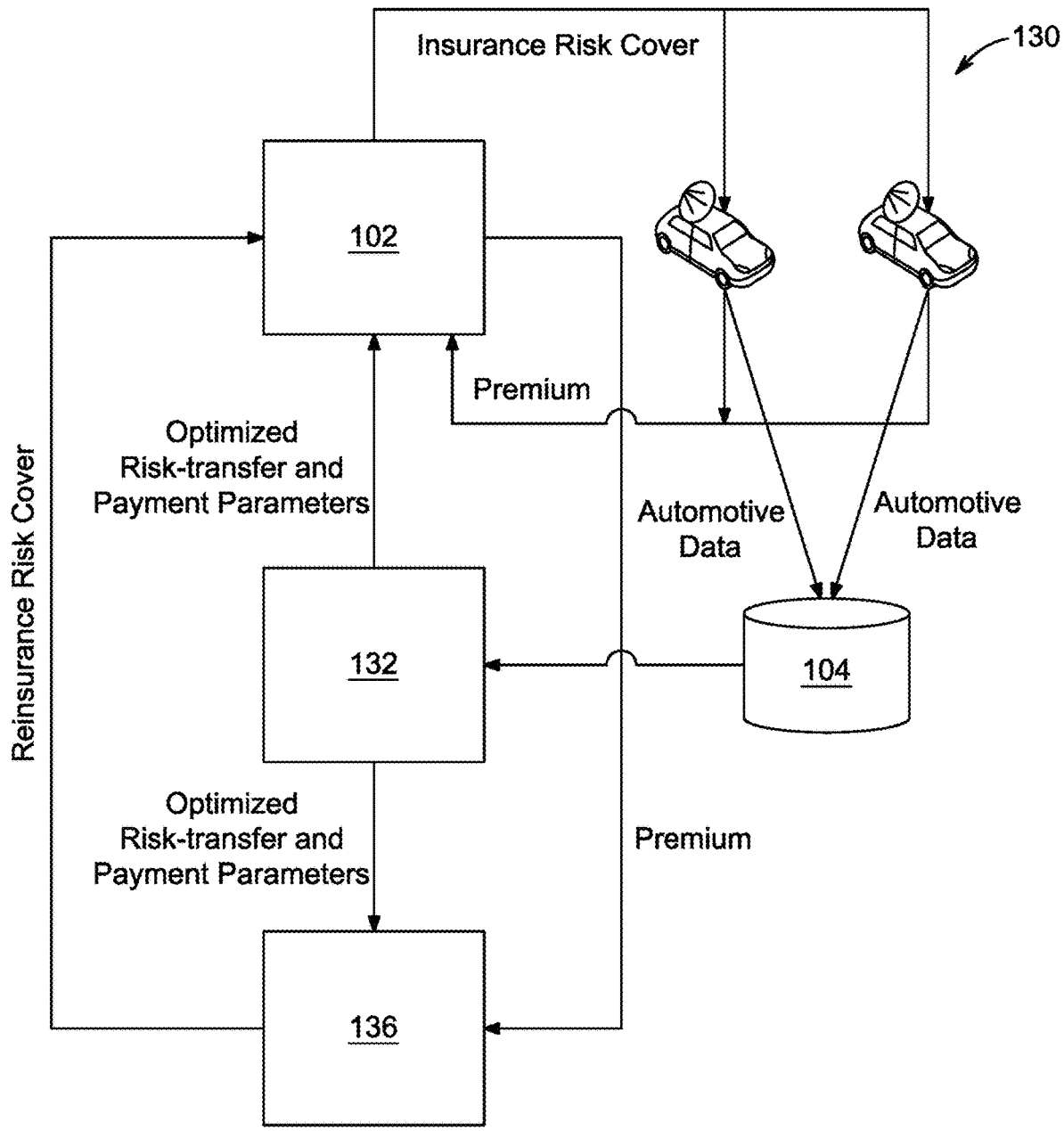
FIG. 5 is a block diagram schematically illustrating an exemplary dynamically adaptable configuration with a plurality of risk-exposed, associated motor vehicles provided by the system of FIG. 1, according to certain embodiments.

The automotive risk-measuring system 130 can e.g. comprise one or more first risk-transfer systems 132 to provide a first automated risk-transfer 1321 based on generated electronic signaling transmitting first risk transfer parameters 13211 from at least some of the motor vehicles 10 to one of the first risk-transfer systems 132, wherein the first risk transfer parameters 13211 are at least partially generated based upon the output signal generation steered and/or adapted by measured trip or trip-segment and risk measure parameters based on the telematics data, wherein the first risk-transfer systems 132 comprise a plurality of first payment transfer modules 134 configured to receive and store first payment parameters 13212 associated with risk-transfer 1321 of risk exposures of said motor vehicles 10 for pooling of their risks. The automotive risk-measuring system 130 further comprises a second risk-transfer systems 136 to provide a second risk-transfer 1361 based on second risk-transfer parameters 13611 from one or more of the first risk-transfer systems 132 to the second risk-transfer systems 136, wherein the second risk-transfer systems 136 comprises second payment transfer modules 138 configured to receive and store second payment parameters 13612 for pooling of the risks of the first risk-transfer systems 132 associated with risk exposures transferred to the first risk-transfer systems 132. The operation of the automotive risk-measuring system 130 has been explained further in reference to FIG. 1 in combination with FIGS. 3 and 4 in the proceeding paragraphs.

As illustrated by the figures, in the system 100, the vehicle-telematics driven aggregator 122 of the dynamic telematics circuit 102 can e.g. be associated with the second risk-transfer systems 136. Thereby, risk-related usage-based and/or user-based telematics data captured from the mobile telematics devices 104 are triggered and monitored by means of telematics data-based triggers in the dataflow pathway of the mobile telematics devices 104. For this purpose, the driving score module 124 of the dynamic telematics circuit comprises a trigger for triggering and automatically selecting scores driver parameters based on defined scores driver behavior pattern by comparing captured telematics data with the defined scores driver behavior pattern. Further, as discussed, the driving score module 124 is configured for measuring and/or generating a single or a compound set of variable scoring parameters profiling the use and/or style and/or environmental condition of driving during operation of the motor vehicle 10 based upon the captured, triggered and monitored risk-related usage-based and/or user-based and/or operational telematics data. Furthermore, the driving score module 124 automatically captures scores risks according to the measured location or trip of the motor vehicle 10 based on the captured telematics data of the mobile telematics devices 104 associated with the motor vehicles 10.

In the present system 100, a shadow request is transmitted to at least one of the first risk-transfer systems 132 decentrally connected to the dynamic telematics circuit 102 over a data transmission network 140 (as shown in FIG. 1). The shadow request comprises at least said single or a compound set of variable scoring parameters and/or risk-relevant parameters based upon the captured, triggered, and monitored risk-related usage-based and/or user-based and/or operational telematics data. In particular, the shadow request is transmitted to a plurality of automated first risk-transfer systems 132, decentrally connected to the dynamic time warping based telematics circuit 102 over the data transmission network 140. The shadow request comprises at least risk-relevant parameters based upon the measured and/or generated single or compound set of variable scoring parameters. The risk-relevant parameters of the shadow request may include at least usage-based and/or user-based and/or operating telematics data measured and/or generated by the mobile telematics devices 104 based upon the triggered, captured, and monitored sensory data of the sensors of the mobile telematics device 104 and/or operating parameters or environmental parameters, and the generated single or set compound of variable scoring parameters.

The shadow requests may be periodically transmitted to the plurality of automated first risk-transfer systems 132 based on the dynamically generated single or compound set of variable scoring parameters and/or the triggered, captured, and monitored sensory data of the sensors of the mobile telematics device 104 and/or operating parameters or environmental parameters. However, the shadow requests may also be generated and transmitted to the plurality of automated fist risk-transfer systems 132 based on the dynamically generated single or compound set of variable scoring parameters and/or the triggered, captured, and monitored sensory data of the sensors of the mobile telematics device 104 and/or operating parameters or environmental parameters, if the dynamic trip-detection telematics circuit 102 triggers an alternation of the dynamically generated single or compound set of variable scoring parameters and/or the triggered, captured, and monitored sensory data of the sensors of the mobile telematics device 104 and/or operating parameters or environmental parameters.

In response to the transmitted shadow request, individualized risk-transfer profiles based upon the dynamically collected single or compound set of variable scoring parameters can e.g. be transmitted from the at least one first risk-transfer systems 132 to a corresponding motor vehicle 10 and issued by means of an interface of the mobile telematics devices 104 for selection by the driver of the motor vehicles 10. That is, the dynamic time warping based telematics circuit 102 receives in response to the transmitted shadow request a plurality of individualized risk-transfer profiles based upon the dynamically collected single or compound set of variable scoring parameters. Herein, the result list may be dynamically adapted in real-time and displayed to the user for selection via the dashboard or another interactive device of the telematics devices 104 and/or the motor vehicles 10. Further, the dynamic trip-detection telematics circuit 10 may dynamically capture and categorize the received plurality of individualized risk-transfer profiles of the automated first risk-transfer systems 132. The result list may be dynamically provided for display and selection to the user of the mobile telematics devices 104 and/or motor vehicle 10 by means of the motor vehicles' dashboards based upon the triggered, captured, and monitored sensory data of the sensors of the mobile telematics device 104 and/or operating parameters or environmental parameters during operation of the telematics devices 104 and/or motor vehicle 10.

The driving score module 124 of the dynamic telematics circuit 102 can further e.g. comprise a trigger for triggering and automatically selecting scores driver parameters based on defined scores driver behavior pattern by comparing captured telematics data with the defined scores driver behavior pattern. In another embodiment, the driving score module 124 automatically captures scores risks according to the measured location or trip of the motor vehicle 10 based on the captured telematics data of the mobile telematics devices 104 associated with the motor vehicles 10. That is, the score driving module may further automatically capture scores risks according to the measured location or trip of the motor vehicle 10 based on the captured telematics data of the mobile telematics device 104. This configuration has, inter alia, the advantage that it allows to provide a real-time adapted multi-tier risk-transfer system. Further, it allows to capture and/or control the score driving behavior (also in the sense of location, time, road etc., of the driving), and compare its behavior within the technical operation and context. It allows to automatically capture score risks according to location and/or detected trip, and to automatically analyze and react on data related to the need of added services, as, for example, accident notifications).

The shadow request can e.g. be transmitted to a corresponding first risk-transfer system 132, if transmission of the shadow request is permitted by means of an access control unit 150 (as shown in FIG. 1) of the mobile telematics device 104, wherein the single or a compound set of variable scoring parameters are generated by means of the driving score module 124 associated with the second risk-transfer systems 136. Herein, the access control unit 150 of the mobile telematics device 104 comprises a definable distribution table comprising a variable list with at least one first risk-transfer system 132, wherein the transmission of the shadow request to a specific first risk-transfer system 132 depends on the definable distribution table of the access control unit 150 of the mobile telematics device 104. Specifically, the dynamic telematics circuit 102 includes the distribution table with stored categorization trigger parameters for triggering a predefined level of scores, wherein the first and second risk transfer parameters and the correlated first and/or second payment transfer parameters are dynamically adapted and/or accumulated by means of the central, expert-system based circuit based on the triggered categorization of the driving motor vehicles during usage and based upon the usage-based and/or user-based and/or operational automotive data captured from the plurality of driving motor vehicles 10. Further, an individualized risk-transfer profiles of the first risk-transfer system 132 is only issued by means of a display of the cellular mobile device 120 for selection by the driver of the motor vehicles 10 if issuance is permitted by means of the access control unit 150 of the present system 100. Therefore, the plurality of individualized risk-transfer profiles, provided by the automated first risk-transfer systems 132, time-dependently vary based on the generated single or compound set of variable scoring parameters measuring the time-dependent use and/or style and/or environmental condition of driving during operation of the telematics devices 104 and/or motor vehicle 10. The system 100 may automatically alert the user, if a more preferable risk-transfer profile is triggered in relation to a before selected risk-transfer profile. Further, the telematics-based system 100 may also automatically adapt a risk-transfer associated with a user or motor vehicle 10, if a more preferable risk-transfer profile is triggered in relation to a selected risk-transfer profile. The result list may dynamically be adapted in real-time and displayed to the user for selection based upon definable categorization criteria as for example first payment parameters and/or duration and/or risk-transfer structure.

The present system 100 can e.g. also comprise capturing means for capturing a transfer of payment from the first risk-transfer system 132 to the second payment-transfer module 138, wherein the second layer trigger structure of the system 130 is activatable by triggering a payment transfer matching a predefined activation threshold parameter. In an example, in the case of triggering the occurrence of a loss associated with the occurrence of the defined risk events, a predefined defined portion of the occurred loss covered by the second insurance system based on the second risk transfer parameters and correlated second payment transfer parameters. Thus, the present system 100 may be realized with a proportional or a non-proportional risk-transfer as coupling mechanism between the first risk-transfer systems 132 and the second risk-transfer systems 136, wherein under proportional risk-transfer coupling, the second risk-transfer systems 136 is activated by the automotive risk-measuring system 130 by a fixed percentage share of each risk transferred to the first risk-transfer system 132 respectively each loss transferred to the automotive risk-measuring system 130. Accordingly, the second risk-transfer systems 136 receives that fixed payment transfer from the first risk-transfer system 132 by means of the second payment parameters. Under non-proportional risk-transfer coupling, in case of triggering the exceedance of a defined activation threshold parameter associated with the occurrence of the defined risk events, the occurred loss is at least partly covered by the second insurance system based on the second risk transfer parameters and correlated second payment transfer parameters. The activation threshold may be associated with every single loss that occurred or on the accumulated loss measured by means of the aggregated loss parameter. Thus, the non-proportional coupling may be realized in excess of loss or stop loss risk-transfer structure, wherein the excess of loss structure may be based on a Per Risk XL (Working XL), Per Occurrence/Per Event XL (Catastrophe or Cat XL), or Aggregate XL structure. In particular, a periodic payment transfers from the risk exposure components to the system 100 via a plurality of the second payment transfer modules 138 is requested by the system 100, wherein the risk transfer or protection for the risk exposure components is interrupted, when the periodic transfer is no longer detectable. As an alternative, the periodic payment transfer request may be interrupted automatically or waived when the occurrence of indicators for a risk event is triggered in the data flow pathway of a risk exposure component. Thus, the present system allows for further automation of the monitoring operation, especially of its operation with regard to the pooled resources.

The dynamic telematics circuit 102 may include means for processing risk-related trip detection data and driving motor vehicle data and for providing data regarding the likelihood of said risk exposure for one or a plurality of the pooled risk exposed motor vehicle, in particular, based on the risk-related motor vehicle data, and wherein the receipt and preconditioned storage of payments from the risk exposed motor vehicles for the pooling of their risks may be dynamically determined based on the total risk and/or the likelihood of risk exposure of the pooled risk-exposed motor vehicles. Thus, the operation of the first risk-transfer systems 132 and/or the second risk-transfer systems 136 may be dynamically adjusted to changing conditions in relation to the pooled risk, such as a change of the environmental conditions or risk distribution, or the like, of the pooled motor vehicles. A further advantage is that the system 100 does not require any manual adjustments, when it is operated in different environments, places or countries, because the size of the payments of the risk exposed motor vehicles is directly related to the total pooled risk. However, it is important to note that the present system 100 does not necessarily have to lead to adjusted pricing or premiums. For example, the system 100 may also automatically provide coupons to automated motor vehicles driving in low risk regions, or that nothing at all changes but that the system 100 uses the automotive data to automatically decide if the risk-transfer is continued the next year. The present system 100 may also exclusively be used for automatically providing and activating adapted and/or specifically selected value added services, as, for example, accident notifications and/or feedback to the motor vehicle or driver and/or automated fleet risk reporting and/or automated and dynamically optimized underwriting, etc. Thus, the present system 100 allows an adaption of the risk of the first risk-transfer systems 132 as well as risk on level of the insured motor vehicles (e.g., by risk-based driver feedback in real-time) and/or the second risk-transfer systems 136. Herein, the feedback may be generated by comparing the motor vehicle's profile and pattern with other motor vehicle's profiles or patterns at the same location and/or comparable conditions.

Further, the system 100 can e.g. comprise means for processing risk-related component data and for providing information regarding the likelihood of said risk exposure for one or a plurality of the pooled risk exposed motor vehicles, in particular, based on risk-related trip detection and/or motor vehicles' data, and wherein the receipt and preconditioned storage of payments from the first resource pooling system to the second resource pooling system for the transfer of its risk may be dynamically determined based on the total risk and/or the likelihood of risk exposure of the pooled risk exposure components. This allows that the operation of the first risk-transfer systems 132 and/or the second risk-transfer systems 136 may be dynamically adjusted to changing conditions of the pooled risk, such as changes of the environmental conditions or risk distribution, or the like, of the pooled risk components. A further advantage is the fact that the system 100 may not require any manual adjustments, when it is operated in different environments, places or countries, because the size of the payments of the risk exposure components is directly related to the total pooled risk.

The risk event triggers can e.g. be dynamically adjusted based on time-correlated incidence data for one or a plurality of the predefined risk events. This allows that improvements in capturing risk events or avoiding the occurrence of such events, for example by improved forecasting systems, etc., may be dynamically captured by the present system 100 and dynamically affect the overall operation of the system 100 based on the total risk of the pooled risk exposure components. Further, upon each triggering of an occurrence, where parameters indicating a predefined risk event are measured, by means of at least one risk event trigger, a total parametric payment is allocated with the triggering, and wherein the total allocated payment is transferrable upon a triggering of the occurrence. The predefined total payments may, for example, be leveled to any appropriate defined total sum, such as a predefined value, or any other sum related to the total transferred risk and the amount of the periodic payments of the risk exposed motor vehicle. This allows that the parametric payments or the payments of predefined amounts may be relied on fixed amounts. Further, the parametric payment may allow for an adjusted payment of the total sum that may, for example, be dependent on the stage of the occurrence of a risk event, as triggered by the system 100. This allows to provide new and unified approach for automated risk-transfer for risk associated with risk-exposed motor vehicles, considering dynamically measured, usage-based parameters, allowing a new optimization in the level of the risk-exposed vehicle as well as on the level of the operational pooling of risk-exposure of the first risk-transfer system 132 and/or the second risk-transfer systems 136.

The driving score module 124 can e.g. automatically capture scores risks according to a measured maintenance (e.g., maintenance failure by owner) and surveillance factor extracted from the automotive data associated with the motor vehicle 10 or the use of active safety features. The telematics based feedback means of the present system 100 may include a dynamic alert feed via a data link to the motor vehicle's automotive control circuit, wherein the central, expert-system based circuit heads up device alerts drivers immediately to a number of performance measures including e.g., high RPM, i.e., high revolutions per minute as a measure of the frequency of the motor rotation of the motor vehicle's engine, unsteady drive, unnecessary engine power, harsh acceleration, road anticipation, and/or ECO drive. Such dynamic accident causation and accident risk measuring provides the opportunities for risk-adaption and improvement dynamically and in real-time, i.e., as and when such events happen, related to the motor vehicle's risk patterns (e.g., location, speed, etc.). Providing such instant feedback to drivers through heads up training aids and get information sent straight to the mobile telematics device 104, ensures a two-pronged approach to correcting risky (and often expensive) driving habits. Thus, the present system 100 not only allows to mutually optimize the operational parameters of the first risk transfer system 132 and the second risk transfer systems 136, but also optimize the risk and/or risk behavior on the level of the risk exposed motor vehicles. As another value added service, the system 100 may dynamically generate fleet risk reports of selected motor vehicles. Such fleet reports provide a new approach to share and compare vehicles' statistics. The proposed system 100 with prefunding automotive enabled risk-transfer ((re) insurance) means will stimulate the carriers (first risk-transfer systems 132) to provide its automotive data and claims' histories to the second risk-transfer systems 136 in order to continually improve its scoring service, which in turn benefits carrier in helping reduce costs and combined ratio.

Figure 6:
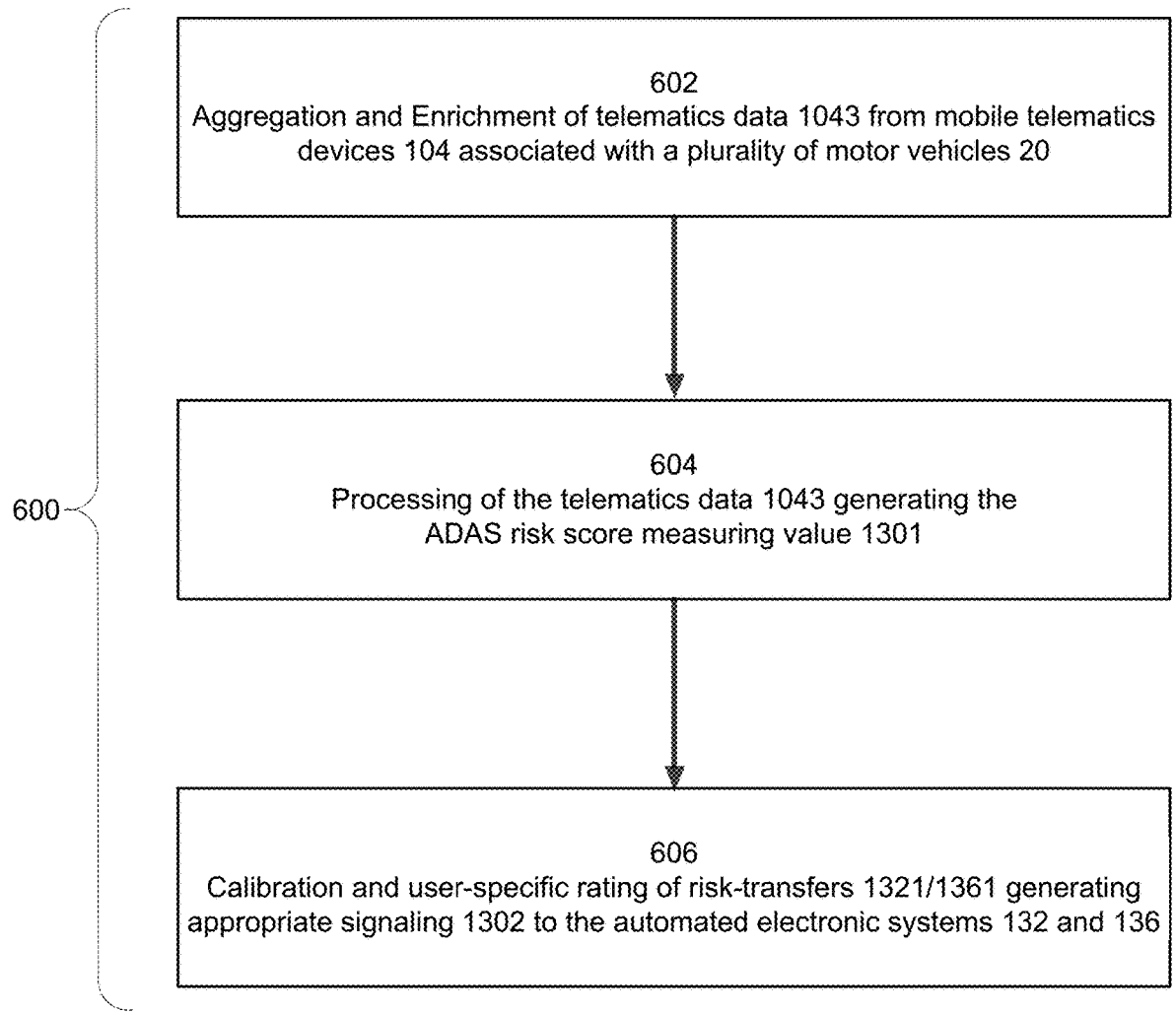
FIG. 6 is an exemplary flowchart illustrating the inventive electronic risk measuring and scoring method for motor vehicles provided with Advanced Driver-Assistance Systems (ADAS) features, according to certain embodiments.

As illustrated in FIG. 6 with the flowchart 600 for electronic risk measuring and scoring method for motor vehicles provided with Advanced Driver-Assistance Systems (ADAS) features. The teachings of the disclosed system 100 may apply mutatis mutandis to the present electronic risk measuring and scoring method without any limitations. At step 602, the present electronic risk measuring and scoring method comprises aggregating telematics data from mobile telematics devices (such as, the mobile telematics devices 104) associated with a plurality of motor vehicles (such as, the motor vehicles 10). At step 604, the said method further comprises processing the telematics data to generate an ADAS risk score measure, the ADAS risk score measure indicates an impact of ADAS features to an accident risk associated with the motor vehicle. At step 606, the said method further comprises calibrating a user-specific rated risk-transfer, wherein the user-specific rated risk-transfer defines an impact of ADAS features in measures of risk-transfer claims frequency and severity.

The system and method of the present disclosure provide a dynamic, expert scoring system based on real-time scoring and measurements, and further provide a technically scalable solution based on scoring algorithms and data processing allowing to adapt and compare the signaling to other field of automated risk-transfer. The present disclosure achieves this, particularly, in that, by the ADAS risk score measure to evaluate the impact of ADAS features to the accident risk associated with the motor vehicles, and in that a risk-transfer is user-specific rated and calibrated capturing the impact of ADAS features in measures of risk-transfer claims frequency and severity. The present disclosure allows to measure the ADAS risk score measure as a risk-transfer typical rating factor, enabling to calibrated to users' specific portfolio, and to capture the impact of ADAS in terms of risk-transfer loss frequency and severity. The present disclosure is able to provides an automated risk-transfer system for all kinds of risk-transfer schemes, as, for example, motor or product liability (re-)insurance systems and/or risk-transfer systems related to or depending on partially or fully automated vehicles. Also, the present disclosure provides a holistic and unified, automated technical approach for coverage to the motor vehicles in all different structures of risk-transfer, as, for example, product liability for car and/or technology manufacturer, driver liability cover. Further, the present disclosure also provides a holistic technical solution that covers the whole range from automotive control circuits and/or telematics devices and/or app installations to the automated and accurate risk measuring, analysis and management. Finally, the present disclosure is able to provide a dynamic real-time scoring and measurements, and further provides a technically scalable solution based on scoring algorithms and data processing allowing to adapt the signaling to other fields of automated risk-transfer.

The present system and method also provide technical means to collect telematics data via mobile phone or mobile telematics devices, where in safety technology is properly considered, in particular by overcoming the disadvantages of the prior art systems due to backwards modelling (only) risk models which have been designed around demographic variables as well as basic vehicle characteristics (e.g., vehicle type, engine displacement, engine power). The present system and method relate to reacting dynamically on captured environmental or operational parameters, in particular to telematics system's monitoring, capturing and reacting on motion parameters of motor vehicles during operation or mobile telematics devise in general, thereby measuring, detecting and identifying tips and trip segments of moving telematics devices. The present system and method also relate to telematics based automated risk-transfer, alert and real-time notification systems for telematics associated with motor vehicles and wireless technology used in the context of telematics and automated trip measurements and recognition.

On top of the numerical scores (per coverages and claims components) mentioned in the document, the inventive system also allows to measure general scores reflecting the impact of vehicles components and equipment directly related to the loss resulting from the occurrence of an accident event. It is important to understand that the extensive use of sensors and smart devices in the present invention, e.g. also related to the 5G technology, are fueling the measurement of an increasing amount of data by the inventive system, much of it in real time. These telematics data provide valuable insights. While it improves risk assessment and transfer, it allows to precisely predict and/or prevent risks, i.e. occurring accident events, as well as optimizing a wider range of risk-transfer coverage. In connection with the present system, IoT can be used as a further key driver of the present data generation and measurements. The precise measurements and forecast structures are technically important also due to the fact, that there is typically a complex and hardly to parameterize relation between the measured accident frequency and severity and the actual occurring and measured physical loss, e.g. at the vehicle. By its structure, the inventive system allows to forecast actually occurring risk-transfer (insurance) claims based on the actual occurring losses and damages as a consequence of an impacting accident event. Risk-transfer claims are still understood as the propensity for claims being triggered and their corresponding severity, i.e. loss severity. As an embodiment variant, the inventive forecast structures and parameterizations can e.g. be supplemented by a non-parametrizable part captured by and Artificial Intelligence or machine learning structure. The learning phase of this structure can e.g. be feed by the measured telematics data (e.g. by feedback learning, or primary unsupervised learning for classification), putting the measured occurrence frequency and severity of accident events and/or the various measured accident events and accident severities together with the measured actual occurring loss severities in relation.

Figure 14:
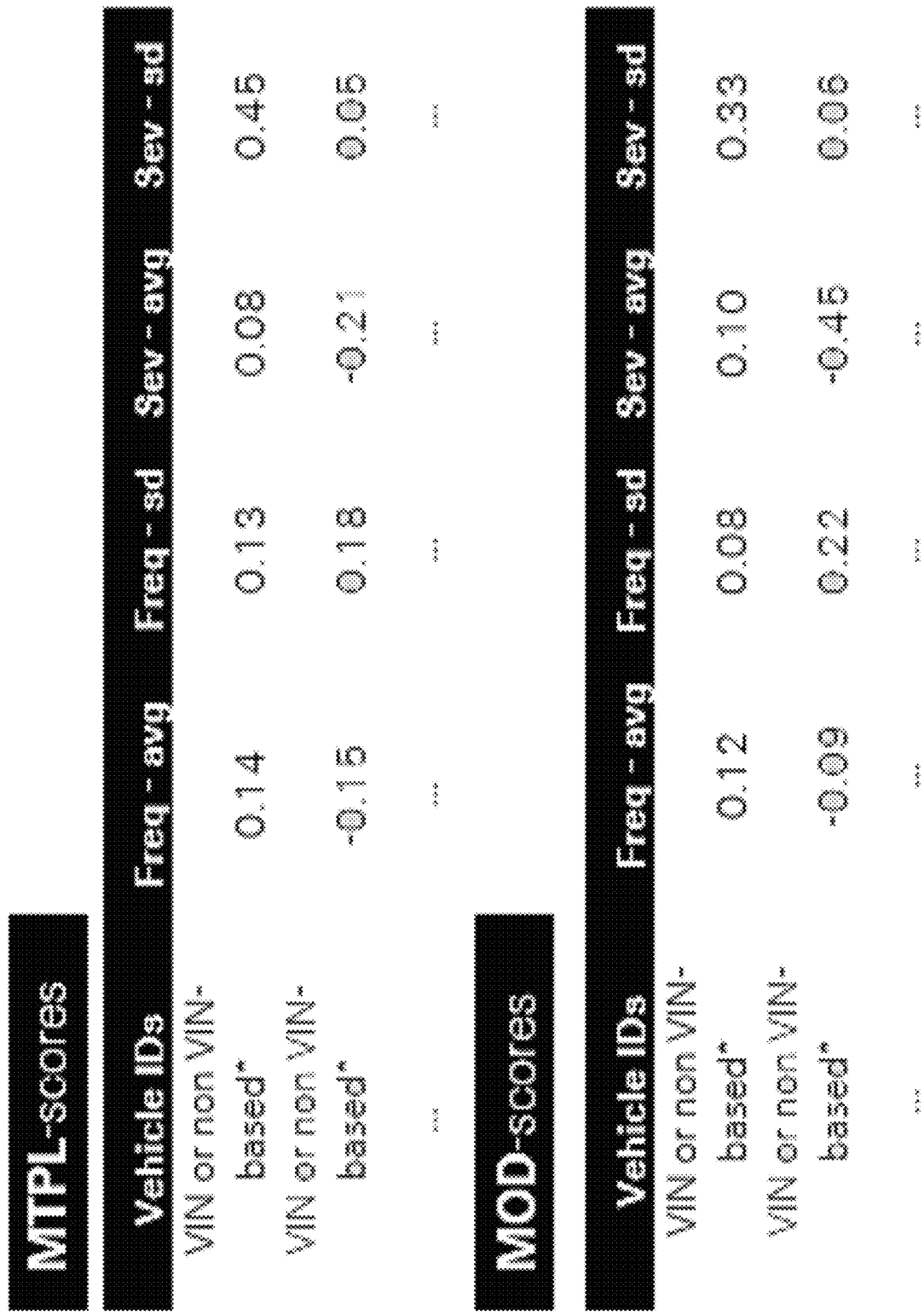
FIG. 14 is a block diagram schematically illustrating an exemplary generation of MTPL-score measures and MOD-score measures. *non VIN-based vehicle IDs consist typically in a combination of car attributes such as [make, model, version] and any other car specification collected by the insurer (e.g. fuel type) which allow Swiss Re to accurately identify a (set of) vehicle(s) in absence of VIN and return a high resolution ADAS risk score.

In a further embodiment variant (c.f. FIG. 14) relating to the vehicle identification, the inventive system can identify vehicles according to their VIN and/or a combination of their attributes in a flexible way, depending on the car data available (i.e. score can be returned at VIN level or at any combination of car attributes if needed).

LIST OF REFERENCE SIGNS

10 Motor vehicle
    200 ADAS features
        2001 Adaptive cruise control
        2002 Glare free high beam and pixel light
        2003 Anti-lock braking system
        2004 Automatic parking
            20041 Automatic valet parking
        2005 Automotive navigation system
        2006 Automotive night vision
        2007 Blind spot detection system
        2008 Collision avoidance system
            20081 Pedestrian detection/avoidance
            20082 Automatic emergency braking
            20083 Driver drowsiness detection
            20084 Driver monitoring system
        2009 Crosswind stabilization
        2010 Intelligent speed adaptation
        2011 Lane centering
        2012 Lane departure warning system
        2013 Lane change assistance system
        2014 Surround view system
        2015 Tire pressure monitoring
        2016 Traffic sign recognition
        2017 Adaptive light control
        2018 V2X-based traffic networking
    106 Vehicle sensing system
        108 Vehicle-based telematics sensors
        110 Sensors and/or measuring devices
        200 Exteroceptive sensors 202 Radar devices
204 LIDAR devices
206 Global Positioning Systems (GPS) and/or Vehicle tracking devices
208 Odometrical devices
210 Computer vision devices
212 Ultrasonic sensors
220 Proprioceptive sensors
  222 Motor speed measuring device
  224 Wheel load
  226 Heading
  228 Battery status
  230 Speedometer/tachometer
118 Further sensors
112 On-board diagnostic system
114 In-vehicle interactive devices
116 Vehicle's data transmission bus
100 Electronic measuring system for measurements of accident occurrences frequencies and severities with associated signaling
102 Dynamic telematics circuit
  122 Vehicle-telematics driven aggregator
  124 Driving score module
    1241 Scoring measuring parameters
      12411 Driving score measure
      12412 Contextual score measure
      12413 Vehicle safety score measure
104 Mobile telematics devices
  118 Sensors
    1181 GPS module (Global Positioning System)
    1182 Geological compass module/3-axis teslameter
    1183 3-axis accelerometer
    1184 Gyrosensor or gyrometer
    1185 MEMS accelerometer sensor
    1186 Three-axis magnetometers
      11861 MEMS magnetometer or a magneto-resistive permalloy Sensor
  120 Cellular mobile phone/cellular smart-phone
  1041 Data transmission interfaces
    10411 Wireless interfaces
      104111 Radio data systems (RDS) module
      104112 Satellite receiving module
      104113 GSM-module
      104114 Digital radio service module
    10421 Wired interfaces
  1042 Wireless network nodes
  1043 Telematics data
    300 Logs data
      302 Trip information logs data
      304 Diagnosis logs data
      306 Activity logs data
      308 Location logs data
      310 User logs data
      312 Vehicle logs data
    314 Types of telematics data
      3141 Trips or trip segments
      3142 Driving patterns
      3143 Automation level data
130 Automotive measuring system of occurring forward-looking accident frequencies and severities and/or risk-measuring system
  1301 ADAS risk score measure value
  1302 Electronic signal generation
132 First risk-transfer systems
  1321 First risk transfers
    13211 First risk transfer parameters
    13212 First payment parameters
  134 First payment transfer modules
136 Second risk-transfer systems
  1361 Second risk transfers
    13611 Second risk transfer parameters
    13612 Second payment parameters
  138 Second payment transfer modules
140 Data transmission network
  1401 Cellular mobile network/GSM network
150 Access control unit
600 Flowchart illustrating the electronic risk measuring and scoring for motor vehicles provided with Advanced Driver-Assistance Systems (ADAS) features
  602 Aggregation of telematics data from mobile telematics devices
  604 Processing of the telematics data generating the ADAS risk score measure value
  606 Calibration and user-specific rating of the risk-transfer

The invention claimed is:

1. An electronic measuring system for forward-looking measurements of frequencies or probability measuring values of localized accident occurrences associated with motor vehicles provided with at least one of a plurality of electronic Advanced Driver-Assistance Systems (ADAS) comprising an activatable ADAS warning system, ADAS crash avoidance system and a passive safety system comprising air bag and advanced seatbelts, the electronic measuring system comprising:

the plurality electronic Advanced Driver-Assistance Systems (ADAS), which at least comprise adaptive cruise control, glare free high beam and pixel light, anti-lock braking system, automatic parking, automotive navigation system, automotive night vision, blind spot detection system, collision avoidance system, cross-wind stabilization, intelligent speed adaptation, lane centering, lane departure warning system, lane change assistance system, surround view system, and tire pressure monitoring, a dynamic telematics circuit configured to aggregate telematics data from mobile telematics devices associated with a plurality of the motor vehicles capturing trips or trip segments and driving patterns from the motor vehicles or automation level data of the motor vehicle, the telematics circuit comprising telematics components monitoring driving behavior, speed pattern, distance traveled, and driving environment for assessing the level of protection by capturing at least location, speed, idling time, harsh acceleration or braking, and fuel consumption, and the telematics data including at least one of ADAS features activation parameters, operational parameters of the motor vehicles, driver condition parameters, and contextual parameters of a location of the motor vehicles; and an automotive risk measuring system for measuring occurring forward-looking accident frequencies and severities based on the telematics data, wherein the localized accident occurrences measure the impact of both active and passive safety systems based on a chosen time window, and wherein the automotive risk measuring system is configured to process the telematics data by generating an ADAS risk score measure, and the ADAS risk score measure provides a measure for an impact of activated ADAS features to a location-specific probability for an accident occurrence in respect to a specific accident impact severity associated with a motor vehicle, wherein the measuring of occurring forward-looking accident frequencies and severities is based on an ADAS features activation parameters-based structured simulation structure enabled to parameterize driver error reduction or the specific use of ADAS features and wherein in case of a driver failing to operate the motor vehicle safely, an alarm is triggered by an ADAS warning system to the driver based on the generated ADAS risk score measure, wherein when there is a failure of the alarm triggered by the ADAS warning system, a switch triggers the activation of the ADAS crash avoidance system, and when there is a failure of the activation of the ADAS crash avoidance system, the switch triggers an activation of the vehicle passive system.

2. The electronic measuring system according to claim 1, wherein a measured accident occurrence probability of one of the motor vehicles equipped with the ADAS and the passive systems is measured or forecasted for a defined time-window by dynamically varying the simulation structure in a degree of complexity triggering for a minimal measuring error value.

3. The electronic measuring system according to claim 2, further comprising a database with factors enabling triggering of different types of errors and their causal factors in accidents based on the telematics data and associated trigger factors for automated identification of different errors and causes in accidents.

4. The electronic measuring system according to claim 1, further comprising means to calibrate and rate or price user-specific rate-parameters for automated risk-transfers, wherein
the user-specific rated risk-transfers are based on the measured impact of the activated ADAS features in measures of event frequency and severity or impacted loss of occurring events, and
the user-specific rate-parameters at least include an amount value for resource allocation in relation to an automotive risk to be transferred.

5. The electronic measuring system according to claim 1, wherein the mobile telematics devices are associated with a plurality of cellular mobile devices.

6. The electronic measuring system according to claim 5, wherein
the mobile telematics devices are connected to an on-board diagnostic system or an in-vehicle interactive device, and
the mobile telematics devices capture usage-based or user-based or operation-based telematics data of the motor vehicle or a user.

7. The electronic measuring system according to claim 1, wherein
the mobile telematics devices associated with the plurality of the motor vehicles include one or more wireless or wired connections, and a plurality of interfaces for connection with at least one of a vehicle data transmission bus, or a plurality of interfaces for connection with sensors or measuring devices, and
for providing the wireless connection, the mobile telematics device acts as wireless node within a corresponding data transmission network by means of antenna connections of the mobile telematics device.

8. The electronic measuring system according to claim 1, wherein GPS points of sets of motion status signals are at least partially enriched by measured additional sensory data measured by further sensors of the mobile telematics device or by sensory data measured by vehicle-based telematics sensors at any stage before transferring the sets of motion status signals to the dynamic telematics circuit.

9. The electronic measuring system according to claim 1, wherein
the automotive risk measuring system includes one or more first risk-transfer systems configured to provide a first risk-transfer based on first risk transfer parameters from at least some of the motor vehicles to one of the first risk-transfer systems,
the first risk transfer parameters are at least partially generated based upon an output signal generation steered or adapted by measured trip or trip-segment and risk measure parameters based on the telematics data,
the first risk-transfer systems include a plurality of payment transfer modules configured to receive and store first payment parameters associated with risk-transfer of risk exposures of said some of the motor vehicles for pooling of their risks,
the automotive risk measuring system includes a second risk-transfer system configured to provide a second risk-transfer based on second risk-transfer parameters from one or more of the first risk-transfer systems to the second risk-transfer system,
the second risk-transfer system includes second payment transfer modules configured to receive and store second payment parameters for pooling of the risks of the first risk-transfer systems associated with risk exposures transferred to the first risk-transfer systems,
by means of a vehicle-telematics driven aggregator of the dynamic telematics circuit associated with the second risk-transfer system, risk-related usage-based or user-based telematics data captured from the mobile telematics devices are triggered and monitored by means of telematics data-based triggers in the dataflow pathway of the mobile telematics devices,
the dynamic telematics circuit associated with the second risk-transfer system further includes a driving score module measuring or generating a single or a compound set of variable scoring parameters profiling a use or a style and/or an environmental condition of driving during operation of the motor vehicle based upon the captured, triggered and monitored risk-related usage-based or user-based telematics data,
the dynamic telematics circuit associated with the second risk-transfer system is configured to transmit a shadow request to at least one of the first risk-transfer systems decentrally connected to the dynamic telematics circuit over a data transmission network,
the shadow request includes at least said single or said compound set of variable scoring parameters or risk-relevant parameters based upon the captured, triggered and monitored risk-related usage-based or user-based telematics data, and
in response to the transmitted shadow request, individualized risk-transfer profiles based upon the single or the compound set of variable scoring parameters are transmitted from at least one of the first risk-transfer systems to a corresponding motor vehicle and issued by means of an interface of the mobile telematics devices for selection by a driver of the motor vehicles.

10. The electronic measuring system according to claim 9, wherein the driving score module of the dynamic telematics circuit includes a trigger for triggering and automatically selecting scores driver parameters based on a defined scores driver behavior pattern by comparing captured telematics data with the defined scores driver behavior pattern.

11. The electronic measuring system according to claim 9, wherein the driving score module automatically captures scores risks according to a measured location or trip of the motor vehicle based on the captured telematics data of the mobile telematics devices associated with the motor vehicles.

12. The electronic measuring system according to claim 9, wherein
the shadow request is transmitted to a corresponding first risk-transfer system, when transmission of the shadow request is permitted by means of an access control unit of the mobile telematics device, and
the single or the compound set of variable scoring parameters are generated by the driving score module associated with the second risk-transfer system.

13. The electronic measuring system according to claim 12, wherein
the access control unit of the mobile telematics device includes a definable distribution table including a variable list with at least one first risk-transfer system, and
the transmission of the shadow request to a specific first risk-transfer system depends on the definable distribution table of the access control unit of the mobile telematics device.

14. The electronic measuring system according to claim 9, wherein the single or the compound set of variable scoring parameters profiling the use or the style or the environmental condition of the driving during the operation of the motor vehicle include at least scoring parameters measuring a driving score or a contextual score or a vehicle safety score.

15. The electronic measuring system according to claim 9, wherein the variable scoring parameters are at least based upon a measure of driver behavior parameters including the measured trip or trip segment.

16. The electronic measuring system according to claim 1, wherein an individualized risk-transfer profile of a first risk-transfer system is only issued by means of a display of a cellular mobile device for selection by a driver of the motor vehicles as permitted by means of an access control unit.

17. The electronic measuring system according to claim 1, wherein the contextual parameters are at least based upon measured trip score parameters based on road type or number of intersection or tunnels or elevation, or measured time of travel parameters, or measured weather parameters or measured location parameters, or measured distance driven parameters.

18. A method implemented by an electronic measuring system for forward-looking measurements of frequencies or probability measuring values of localized accident occurrences associated with motor vehicles provided with at least one of a plurality of electronic Advanced Driver-Assistance Systems (ADAS) comprising an activatable ADAS warning system, ADAS crash avoidance system and a passive safety system comprising air bag and advanced seatbelts, the method comprising:

providing the plurality of electronic Advanced Driver-Assistance Systems (ADAS), which at least comprise adaptive cruise control, glare free high beam and pixel light, anti-lock braking system, automatic parking, automotive navigation system, automotive night vision, blind spot detection system, collision avoidance system, crosswind stabilization, intelligent speed adaptation, lane centering, lane departure warning system, lane change assistance system, surround view system, and tire pressure monitoring, aggregating, by aa dynamic telematics circuit, telematics data from mobile telematics devices associated with a plurality of the motor vehicles capturing trips or trip segments and driving patterns from the motor vehicles and/or automation level data of the motor vehicle, the telematics circuit comprising telematics components monitoring driving behavior, speed pattern, distance traveled, and driving environment for assessing the level of protection by capturing at least location, speed, idling time, harsh acceleration or braking, and fuel consumption, and the telematics data including at least one of ADAS features activation parameters, operational parameters of the motor vehicles, driver condition parameters, and contextual parameters of a location of the motor vehicles; and measuring, by an automotive risk measuring system, occurring forward-looking accident frequencies and severities based on the telematics data, wherein the localized accident occurrences measure the impact of both active and passive safety systems based on a chosen time window, and wherein the automotive risk measuring system is configured to process the telematics data by generating an ADAS risk score measure, wherein, the ADAS risk score measure provides a measure for an impact of activated ADAS features to a location-specific probability for an accident occurrence in respect to a specific accident impact severity associated with a motor vehicle, wherein the measuring of occurring forward-looking accident frequencies and severities is based on an ADAS features activation parameters-based structured simulation structure enabled to parameterize driver error reduction or the specific use of ADAS features, and wherein in case of a driver failing to operate the motor vehicle safely, an alarm is triggered by an ADAS warning system to the driver based on the generated ADAS risk score measure, wherein when there is a failure of the alarm triggered by the ADAS warning system, a switch triggers the activation of the ADAS crash avoidance system, of and when there is a failure of the activation of the ADAS crash avoidance system, the switch triggers an activation of the vehicle passive system.

* * * * *